US010348571B2

(12) United States Patent
Mehta et al.

(10) Patent No.: US 10,348,571 B2
(45) Date of Patent: Jul. 9, 2019

(54) METHODS AND APPARATUS FOR ACCESSING DYNAMIC ROUTING INFORMATION FROM NETWORKS COUPLED TO A WIDE AREA NETWORK (WAN) TO DETERMINE OPTIMIZED END-TO-END ROUTING PATHS

(71) Applicant: Talari Networks Incorporated, San Jose, CA (US)

(72) Inventors: Jigar Mehta, Morrisville, NC (US); Todd Martin, Campbell, CA (US); Sonia Kiang Rovner, Chapel Hill, NC (US); Wei Huang, Cary, NC (US); Adam Phillip Schultz, Morrisville, NC (US)

(73) Assignee: TALARI NETWORKS, INC., San Jose, CA (US)

( * ) Notice: Subject to any disclaimer, the term of this patent is extended or adjusted under 35 U.S.C. 154(b) by 11 days.

(21) Appl. No.: 15/409,016

(22) Filed: Jan. 18, 2017

(65) Prior Publication Data
US 2017/0207963 A1 Jul. 20, 2017

Related U.S. Application Data

(60) Provisional application No. 62/372,021, filed on Aug. 8, 2016, provisional application No. 62/371,998, filed
(Continued)

(51) Int. Cl.
*H04L 12/24* (2006.01)
*H04L 12/751* (2013.01)
(Continued)

(52) U.S. Cl.
CPC ........ *H04L 41/0896* (2013.01); *H04L 41/083* (2013.01); *H04L 41/0813* (2013.01);
(Continued)

(58) Field of Classification Search
CPC . H04L 41/0896; H04L 41/0813; H04L 41/12; H04L 41/083; H04L 43/16;
(Continued)

(56) References Cited

U.S. PATENT DOCUMENTS 8,125,907 B2 2/2012 Averi et al.
8,274,891 B2 9/2012 Averi et al.
(Continued)

*Primary Examiner* — Jianye Wu
(74) *Attorney, Agent, or Firm* — Jenkins, Wilson, Taylor & Hunt P.A.

(57) ABSTRACT

Techniques are described which apply a method for including a routing stack to provide a timely way to dynamically learn about route changes for an end to end system in the context of an adaptive private network (APN). By allowing learned routes to be assigned different services based on filtering rules, the APN can efficiently manage traffic through the WAN. Techniques for learning routes and to advertise the learned routes in different networks are also described. Upon an APN route change being detected in the APN, a route table is updated with the APN route change, wherein the route table contains routes in a local area network (LAN) and routes in a wide area network (WAN). The APN route change is selected from the route table and configured to a protocol for the LAN. The selected APN route change is advertised in the protocol to local routers in the LAN.

24 Claims, 8 Drawing Sheets

Related U.S. Application Data on Aug. 8, 2016, provisional application No. 62/280,356, filed on Jan. 19, 2016, provisional application No. 62/280,448, filed on Jan. 19, 2016, provisional application No. 62/280,381, filed on Jan. 19, 2016.

(51) Int. Cl.
| | |
|---|---|
| *H04L 12/753* | (2013.01) |
| *H04L 12/803* | (2013.01) |
| *H04M 1/725* | (2006.01) |
| *H04L 12/741* | (2013.01) |
| *H04L 12/743* | (2013.01) |
| *H04L 12/935* | (2013.01) |
| *H04L 29/12* | (2006.01) |
| *H04L 12/26* | (2006.01) |
| *H04L 12/707* | (2013.01) |

(52) U.S. Cl.
CPC .............. *H04L 41/12* (2013.01); *H04L 43/08* (2013.01); *H04L 45/02* (2013.01); *H04L 45/22* (2013.01); *H04L 45/48* (2013.01); *H04L 45/54* (2013.01); *H04L 45/7453* (2013.01); *H04L 47/125* (2013.01); *H04L 49/3063* (2013.01); *H04L 61/6022* (2013.01); *H04M 1/72519* (2013.01); *H04L 43/0829* (2013.01); *H04L 43/0876* (2013.01); *H04L 43/0888* (2013.01); *H04L 43/0894* (2013.01); *H04L 43/10* (2013.01); *H04L 43/16* (2013.01); *H04L 43/50* (2013.01)

(58) Field of Classification Search
CPC . H04L 43/0894; H04L 43/50; H04L 43/0888; H04L 43/10; H04L 43/08; H04L 61/6022; H04L 45/02; H04L 45/48; H04L 45/54; H04L 45/7453; H04L 45/22; H04L 47/125; H04L 49/3063; H04L 43/0876; H04L 43/0829; H04M 1/72519
See application file for complete search history.

(56) References Cited

U.S. PATENT DOCUMENTS

| | | |
|---|---|---|
| 8,452,846 B2 | 5/2013 | Fredette et al. |
| 8,644,164 B2 | 2/2014 | Averi et al. |
| 8,775,547 B2 | 7/2014 | Fredette et al. |
| 9,069,727 B2 | 6/2015 | Martin et al. |
| 9,100,338 B2 | 8/2015 | Averi et al. |
| 9,392,061 B2 | 7/2016 | Fredette et al. |
| 2014/0173331 A1* | 6/2014 | Martin ............... G06F 11/2002 714/4.11 |
| 2015/0071067 A1 | 3/2015 | Martin et al. |
| 2016/0072706 A1 | 3/2016 | Huang et al. |
| 2016/0179850 A1 | 6/2016 | Martin et al. |
| 2016/0182305 A1 | 6/2016 | Martin et al. |
| 2016/0182319 A1 | 6/2016 | Martin et al. |
| 2016/0182327 A1 | 6/2016 | Coleman, Jr. et al. |
| 2016/0197802 A1 | 7/2016 | Schultz et al. |

\* cited by examiner

METHODS AND APPARATUS FOR ACCESSING DYNAMIC ROUTING INFORMATION FROM NETWORKS COUPLED TO A WIDE AREA NETWORK (WAN) TO DETERMINE OPTIMIZED END-TO-END ROUTING PATHS

The present application claims the benefit of U.S. Provisional Patent Application Ser. No. 62/280,381 titled "Methods and Apparatus for Accessing Dynamic Routing Information from Networks Coupled to a Wide Area Network (WAN) to Determine Optimized End-to-End Routing Paths" filed on Jan. 19, 2016; U.S. Provisional Patent Application Ser. No. 62/280,356 titled "Methods and Apparatus for Configuring a Standby WAN link in an Adaptive Private Network" filed Jan. 19, 2016; U.S. Provisional Patent Application Ser. No. 62/280,448 titled "Methods and Apparatus for Accessing Selectable Application Processing of Data Packets in an Adaptive Private Network" filed Jan. 19, 2016; U.S. Provisional Patent Application Ser. No. 62/371,998 titled "Applications and Integrated Firewall Design in an Adaptive Private Network (APN)" filed Aug. 8, 2016; and U.S. Provisional Patent Application Ser. No. 62/372,021 titled "Adaptive Private Network (APN) Bandwidth Enhancements" filed Aug. 8, 2016 which are incorporated by reference herein in their entirety.

CROSS REFERENCE TO RELATED APPLICATIONS

The present application is also related to U.S. patent application Ser. No. 14/146,786 filed on Jan. 3, 2014 which issued as U.S. Pat. No. 9,100,338 entitled "Flow-Based Adaptive Private Network With Multiple Wan-Paths", which is a divisional of U.S. patent application Ser. No. 13/592,460 filed on Aug. 23, 2012 which issued as U.S. Pat. No. 8,644,164 entitled "Flow-Based Adaptive Private Network With Multiple WAN-Paths", which is a continuation of U.S. patent application Ser. No. 13/353,693 filed on Jan. 19, 2012 which issued as U.S. Pat. No. 8,274,891 entitled "Flow-Based Adaptive Private Network With Multiple WAN-Paths", which is a continuation of U.S. patent application Ser. No. 12/482,766 filed on Jun. 11, 2009 which issued as U.S. Pat. No. 8,125,907 entitled "Flow-Based Adaptive Private Network with Multiple WAN-Paths", all of which claim the benefit of U.S. Provisional Patent Application No. 61/060,846 entitled "Flow-based Adaptive Private Network with Multiple WAN-Paths" filed Jun. 12, 2008; U.S. patent application Ser. No. 14/291,776 filed on May 30, 2014 which issued as U.S. Pat. No. 9,392,061 entitled "Adaptive Private Network Asynchronous Distributed Shared Memory Services", which is a continuation of U.S. patent application Ser. No. 13/850,411 filed on Mar. 26, 2013 which issued as U.S. Pat. No. 8,775,547 entitled "Adaptive Private Network Asynchronous Distributed Shared Memory Services", and which is a continuation of U.S. patent application Ser. No. 13/208,825 filed on Aug. 12, 2011 which issued as U.S. Pat. No. 8,452,846 entitled "Adaptive Private Network Asynchronous Distributed Shared Memory Services", all of which claim the benefit of U.S. Provisional Patent Application Ser. No. 61/372,904 entitled "Adaptive Private Network Asynchronous Distributed Shared Memory Services" filed Aug. 12, 2010; U.S. patent application Ser. No. 13/719,433 filed on Dec. 19, 2012 which issued as U.S. Pat. No. 9,069,727 entitled "An Adaptive Private Network with Geographically Redundant Network Control Nodes"; U.S. patent application Ser. No. 14/019,723 filed on Sep. 6, 2013 and published as U.S. Patent Application No. 2015-0071067 A1 entitled "An Adaptive Private Network with Path Maximum Transmission Unit (MTU) Discovery Process"; U.S. patent application Ser. No. 14/481,335 filed on Sep. 9, 2014 and published as U.S. Patent Application No. 2016-0072706 A1 entitled "Adaptive Private Network with Dynamic Conduit Process"; U.S. patent application Ser. No. 14/972,270 filed on Dec. 17, 2015 and published as U.S. Patent Application No. 2016-0182305 A1 entitled "Methods and Apparatus for Providing Adaptive Private Network Centralized Management System Discovery Processes"; U.S. patent application Ser. No. 14/972,353 filed on Dec. 17, 2015 and published as U.S. Patent Application No. 2016-0182319 A1 entitled "Methods and Apparatus for Providing Adaptive Private Network Centralized Management System Timestamp Correlation Processes"; U.S. patent application Ser. No. 14/972,514 filed on Dec. 17, 2015 and published as U.S. Patent Application No. 2016-0179850 A1 entitled "Methods and Apparatus for Providing Adaptive Private Network Database Schema Migration and Management Processes"; U.S. patent application Ser. No. 14/973,193 filed on Dec. 17, 2015 and published as U.S. Patent Application No. 2016-0182327 A1 entitled "Methods and Apparatus for Providing Adaptive Private Network Centralized Management System Data Visualization Processes"; U.S. patent application Ser. No. 14/973,343 filed on Dec. 17, 2015 and published as U.S. Patent Application No. 2016-0197802 A1 entitled "Methods and Apparatus for Providing Adaptive Private Network Centralized Management System Time Correlated Playback of Network Traffic"; U.S. patent application Ser. No. 15/409,001 filed on Jan. 18, 2017 entitled "Methods and Apparatus for Configuring a Standby WAN Link in an Adaptive Private Network"; U.S. patent application Ser. No. 15/409,006 filed on Jan. 18, 2017 entitled "Methods And Apparatus For Accessing Selectable Application Processing Of Data Packets In An Adaptive Private Network"; and U.S. patent application Ser. No. 15/409,019 filed on Jan. 18, 2017 entitled "Adaptive Private Network (APN) Bandwidth Enhancements", all of which have the same assignee as the present application, are related applications, and are hereby incorporated by reference in their entirety.

FIELD OF THE INVENTION

The present invention relates generally to improved network management and network optimization techniques that cover local area networks (LANs) and wide area networks (WANs). More specifically, the present invention relates to improved methods for determining optimized routing paths over an end-to-end system connecting different LANs and WANs in response to changes in the end-to-end system in the context of an adaptive private network (APN).

BACKGROUND OF THE INVENTION

Wide area network (WAN) standards include, for example, digital subscriber line (DSL), asymmetric digital subscriber line (ADSL), and multiprotocol label switching (MPLS), to mention a few. WANs are used to connect local area networks (LANs) allowing devices in one location to communicate with devices and their users in other locations. In a WAN having a large number of remote sites, connections between the sites are many times statically configured. The dynamics of the network system may also change over time making repeated static configurations of the network inefficient and costly to implement. Further, static connections involve reservations of network resources. As data flow patterns change in the network, the reserved resources create non-optimal static connections which cause the network to reserve bandwidth that could be better used elsewhere in the network.

WAN standards include, for example, digital subscriber line (DSL), asymmetric digital subscriber line (ADSL), and multiprotocol label switching (MPLS), to mention a few. WANs are used to connect local area networks (LANs) allowing devices in one location to communicate with devices and their users in other locations. For example, site A is anticipated to have high bandwidth requirements for data transfer with site B and site C is anticipated to also have high bandwidth requirements for data transfer with site B. Since at the time the network is configured there may be little anticipated requirement for communication between site A and site C and since sites A and C can communicate to each other by going through site B, a communication path between sites A and C is not statically configured. With the network system operating over time, the original assumptions on communication paths are likely to change. For example, sites A and C may require communication at a much higher bandwidth at this later time than is easily achieved by communicating through the intermediate site B thereby causing congestion on the paths between sites A and B and between sites B and C. A reconfiguration of the network is not usually feasible due to configuration overhead and lost time in operating the network. Also, different types of data packets require different types of compression applications to more optimally reduce packet size and improve network use of available bandwidth. Also, the dynamics of the network system may further change over time making repeated static configuration of the network inefficient and costly to implement. Further, static connections involve reservations of network resources. As data flow patterns change in the network, the reserved resources create non-optimal static connections which cause the network to reserve bandwidth that could be better used elsewhere in the network.

As networks become larger and more complex, administrative techniques for managing the network are increasingly more complex and costly. WAN virtualization and WAN application specific processing, such as use of optimization techniques provide a plurality of applications associated with different data types and functions which if selectable would improve network operation and management. Prior techniques to separately monitor, analyze, and configure a network in response to changes in the network may not provide accurate information and are prone to errors.

SUMMARY OF THE INVENTION

Among its several aspects, the present invention recognizes that a management approach providing more accurate and lower cost techniques to monitor, analyze, and configure a network in response to changes in the network, and to present related data in a user friendly manner is advantageous.

Among its several aspects, the present invention addresses systems and techniques for extending an adaptive private network on a LAN to WAN to LAN network. To such ends, an embodiment of the invention applies a method to learn routes from a first network and advertise the learned routes in a second network for extending an adaptive private network (APN). A route is monitored for a route change in the APN. Upon the route change being detected in the APN, a route table is updated with the APN route change, wherein the route table contains routes learned in a local area network (LAN) and routes learned in a wide area network (WAN). The APN route change selected from the route table is configured to a protocol associated with the LAN. The configured APN route change is advertised in the protocol to local routers in the LAN.

Another embodiment of the invention addresses a method to detect and learn local area network (LAN) and wide area network (WAN) route information in an adaptive private network (APN). Route protocol packets are monitored to detect a route change from routers attached to the LAN and to the WAN. A route table is updated with route information associated with the route change detected in the route protocol packets. The route information is filtered with a matching criteria set up in filter rules, wherein for a route that matches the filter rule's matching criteria, a matching rule sets the route's service and the route is selectively stored into a forwarding information storage.

Another embodiment of the invention addresses a method to reduce outage time in a high availability adaptive private network (APN) system after a failover transfers control to a standby device. An active APN appliance (APNA) is configured to learn about routes in a LAN network connected to the APN and store the learned routes in an active routing table on the active APNA. The learned routes are transferred from the active routing table to a standby APNA to be stored in a standby routing table of the standby APNA during normal operations of the active APNA. The standby APNA is brought up with the learned routes already available from the standby routing table when the active APNA is down, wherein an outage due to the bringing up the standby APNA does not incur time to relearn the routes already stored in the standby routing table.

A further embodiment of the invention addresses a method for efficient management of traffic in a network. Newly determined routes are filtered by comparing information fields of the newly determined routes with provided criteria to identify filtered routes that meet the provided criteria. The filtered routes are mapped to specified services. A route table is updated with the filtered routes and the specified services, wherein changes to existing routes are automatically determined to improve management of traffic in the network.

A more complete understanding of the present invention, as well as other features and advantages of the invention, will be apparent from the following detailed description, the accompanying drawings, and the claims.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1A:
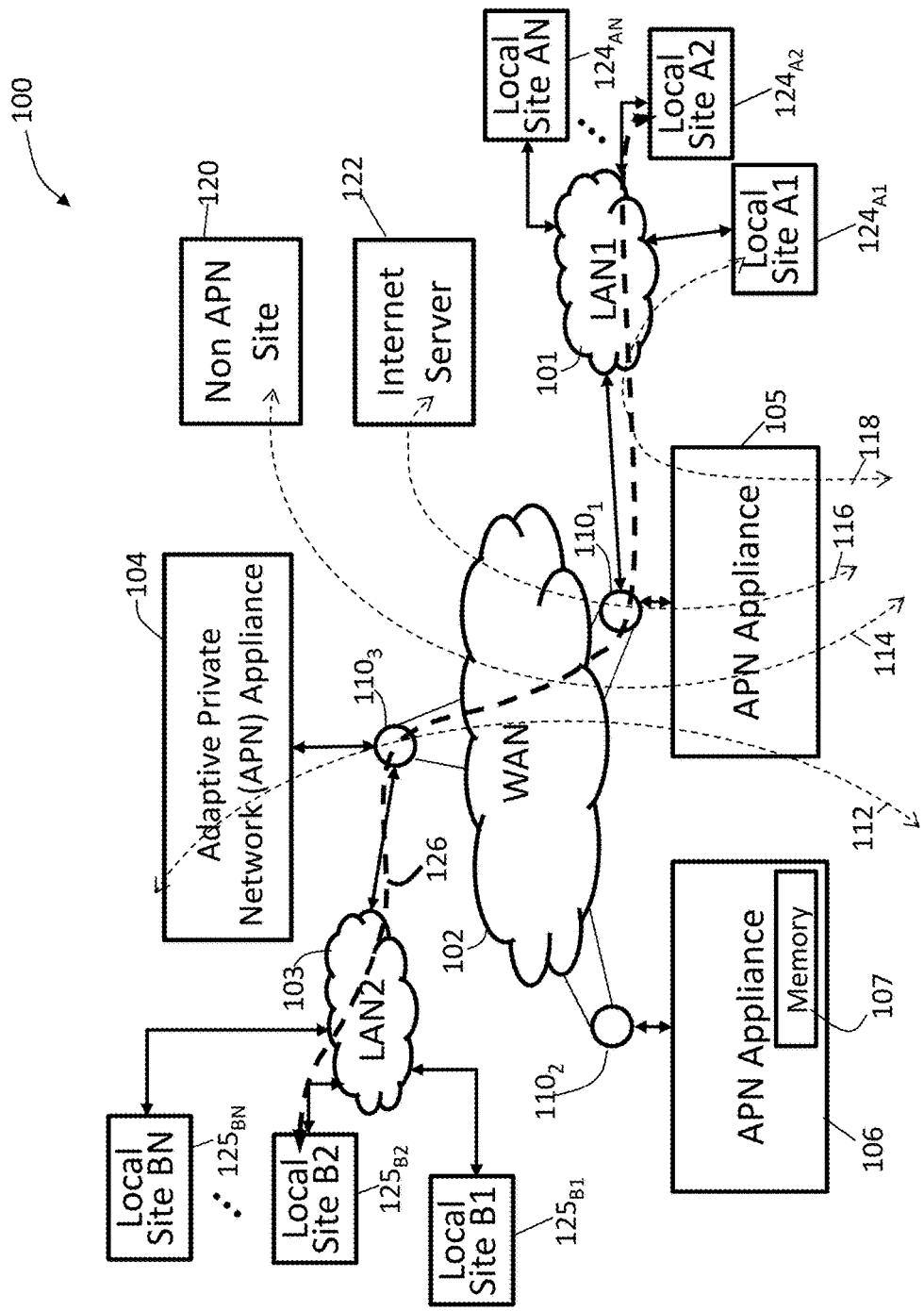
FIG. 1A illustrates an exemplary adaptive private network (APN) with APN service paths in accordance with an embodiment of the present invention.

FIG. 1A illustrates an exemplary adaptive private network (APN) 100 having local sites $124_{A1}$, $124_{A2}$, ... $124_{AN}$, local sites $125_{B1}$, $125_{B2}$, ... $125_{BN}$, on local area networks, LAN1 101 and LAN2 103, respectively, coupled to a wide area network (WAN) 102 under control of the APN showing service paths in accordance with an embodiment of the present invention. The APN 100 includes one or more wide area networks (WANs), such as WAN 102, APN appliances (APNAs) 104-106, WAN routers $110_1$-$110_3$, and network application services as well as APN conduits between the APNAs, as described in more detail below. The APN is configured from a single APNA acting as a network control node (NCN) that provides a single point of control for the APN. First, however, a number of terms used herein are defined with the meaning they have when used in the context of the present invention.

An APN path, also referred to as a regular path, is a logical connection established between two WAN links located at different geographic sites across a WAN where one WAN link sends traffic to the other WAN link. Since Paths are unidirectional entities (one sender and one receiver), two WAN links that are connected to each other will have two paths between them. Each WAN link sees one path as being its transmit path and the other as the receive path. A regular path is used to send user traffic under normal circumstances.

An APN conduit is a virtual connection between two APN nodes, also referred to as client sites, and formed by aggregating one or more APN paths and their allocated WAN link resources. A conduit service is a logical combination of one or more paths. A conduit service is typically used for enterprise site-to-site intranet traffic, utilizing the full value of the APN. With a conduit service, depending on configuration, traffic is managed across multiple WAN links to create an end-to-end tunnel. The conduits overlay a virtual network on top of the underlying network.

A conduit maximum transmission unit (MTU) is defined as a minimum link MTU of the one or more APN paths in the conduit between a source site and a destination site.

An APN appliance (APNA) is a device that contains APN client site functionality including software modules which governs its participation in an APN. A high availability (HA) site contains two APNAs, one that is active and one that is in a standby mode of operation and available to become active in place of the other APNA if required.

A WAN link represents a physical access point to the wide area network (WAN), such as a digital subscriber line (DSL) connection or a cable modem. The distinctive characteristic of a WAN link is the bandwidth, or in other words, the amount of data capacity available for transmission and reception. WAN links can be shared among APN conduits, and intranet and Internet network services. In the present embodiments, the APN appliances do not directly attach to WAN links. APN appliances communicate with WAN links through logical connections, such as the WAN routers $110_1$-$110_3$ of FIG. 1A.

A regular WAN link is a WAN link configured in an active mode, which is the default mode for the WAN link.

A private WAN link provides a physical access point to non-public WAN destinations. Examples of such private WAN links include an asynchronous transfer mode (ATM) link with an ATM virtual circuit, a frame relay link with a frame relay circuit, a multiprotocol label switching (MPLS) tunnel, a virtual private network (VPN) tunnel, or a leased point-to-point line. Connectivity on a network having a private WAN link is made to a private list of destinations on the other end of the network. A public WAN link represents a physical access point to the Internet. It can be assumed that any public WAN link can establish a connection to any other public WAN link.

A local WAN link (LWL) is an APN client site's access point to a WAN. A site A's LWL is coupled to a corresponding remote WAN link for a site B. For a conduit between a site A and a site B, site A's local WAN links are site B's remote WAN links.

An Internet service is used for traffic between an enterprise site and sites on the public Internet. Internet traffic is not encapsulated. During times of congestion, the APN manages bandwidth in the network by rate-limiting Internet traffic relative to traffic on a conduit taking into account the network configuration established by an administrator.

An intranet service is used for any portion of enterprise intranet traffic that has not been defined for transmission across a conduit. As with Internet traffic, the intranet traffic remains un-encapsulated, and the APN manages bandwidth in the network by rate-limiting the intranet traffic relative to other service types during times of congestion. Note that under certain conditions, and if configured for intranet fallback on the conduit, traffic that ordinarily travels via a conduit may instead be treated as intranet traffic in order to maintain network reliability. Since conduit traffic is site-to-site, customers generally have a way to deliver this site-to-site traffic without the conduit. This unencapsulated service, called an intranet service, does not receive the benefits of the conduit. If the conduit tunnel cannot be brought up, then routes which use that conduit are ignored and this means that traffic that would have used the conduit are redirected to use an unencapsulated site-to-site transport method.

A routing domain represents a segmentation of a network. Traffic can only flow within one routing domain, not across routing domains. Separate routing domains may be set up based on segmentation of traffic within an enterprise for security reasons, as when a guest network should be fully segmented from an employee network. In another example, separate routing domains may be set up based on segmentation of traffic within an enterprise for manageability reasons, as when a large corporation organizes its network into distinct routing domains. Also, traffic within a very small aperture terminal (VSAT) satellite network may be segmented into separate routing domains to support multiple tenants at a client site. In a further example, traffic may be segmented within a managed service provider network to separately support multiple customer networks.

A static conduit is a conduit configured in a configuration file and created at startup time of an APNA. A static conduit is not removed without changing the configuration file.

In one embodiment, one form of a software application is an abstraction to allow flows to be grouped together. A criterion that is used to group flows together may vary depending on the intended use. Some organizations may want to group all flows that interact with a company's web domain, such as a sales domain by use of a software sales application, while other organizations may want to view the software sales application as an Internet web browsing application that also includes access to other domains. For example, email is usually used extensively and is also generally considered very important, so it would be reasonable to view a product such as an email software manager as an application. In this scenario, the software sales application would include flows from an email software manager client as well as the email software manager web application web-page.

A dynamic conduit is a conduit created between APN clients when needed and which can be removed when no longer needed.

A WAN application (WANapp) virtual machine is an optimization device, such as a device that provides one or a plurality of selectable compression algorithms or one of a plurality of selectable encryption algorithms that are applied to communication traffic.

A web cache communication protocol (WCCP) is an exemplary protocol for use as described in more detail below. It is appreciated that an alternative protocol may be utilized having similar or different capabilities depending upon a particular software application of the embodiments described herein.

An APN service is a set of processing steps performed on packets that are transmitted through the APN. As illustrated in FIG. 1A, data traffic that moves through the APN 100 and APN appliance 106 may require different types of services depending on where the sending and receiving stations are located. An APN service instance is a particular configured contextual instance of an APN service held in an APN appliance memory 107 internal to the APN appliance 106, for example. An APN service instance's memory contains, but is not limited to, context specific configuration data, statistical data, and tracking states data. For example, an APN client site may have multiple APN conduits that connect to remote APN client sites. For each APN conduit there exists a separate APN service instance for the APN conduit service type.

An APN conduit service associated with path 112 manages network traffic packets that are transmitted through the APN 100 from the APN appliance 105 through router $110_1$, through the WAN 102, through another router $110_3$ to APN appliance (APNA) 104. The APN conduit service for path 112 operates on both APN appliances 104 and 105. The APN conduit service sends and receives data between a first geographic location that has the APNA 105 and a different geographic location that has the APNA 104 utilizing the full benefits provided by the APN conduit service for WAN resource allocation and network adaptation. An APN intranet service associated with path 114 is used to manage the sending and receiving of data between a first geographic location that has the APN appliance 105 and a different geographic location within an enterprise non-APN site 120 that does not have an APN appliance by way of a WAN link that is also utilized by other APN services.

In another embodiment, an APN intranet service, such as the one associated with path 112, may be used to send and receive data to and from a different geographic location that has an APN appliance, but an administrator selectively configures the APN not to use the APN conduit service 112 for a particular type or class of traffic. An APN Internet service associated with path 116 is used to send and receive data between a first geographic location that has the APNA 105 and a different geographic location that is external to an enterprise network by way of a WAN link that is also utilized by other APN services. For example, traffic using the APN Internet service may be associated with a network user accessing a public Internet web server 122. An APN pass through service 118 is used to send and receive data between a first geographic location that has the APNA 105 and a local site $124_{A1}$ within the same first geographic location. In another embodiment, an APN pass through service may be used to send and receive data between a first geographic location that has the APN appliance 105 and a different geographic location within an enterprise network that does not have an APN appliance and does not traverse the WAN using any WAN links associated with any other APN services.

In a further embodiment, a path 126 has a first local site $124_{A2}$ connected to LAN1 101 to APNA 105 to WAN router $110_1$ through the WAN 102 to WAN router $110_3$ to APNA 104 to LAN2 103 to second local site $125_{B2}$. LAN1 101 and LAN2 103 are exemplary networks having a plurality of routers and routing paths which are managed and can change to improve network performance. Determining routing paths in networks attached to the WAN 102, such as the LAN1 101 and LAN 103, is described in more detail below, with respect to FIGS. 3-5.

A conduit comprises multiple paths. A path is formed between 2 WAN links associated with the conduit. Each path in each conduit in the APN is monitored for quality of communication by collecting quality metrics such as packet loss and latency. This monitoring is done by way of control messages and is done on each path whether the path is used to transmit user traffic or not. Accordingly, no path is completely free of traffic unless it is not operational. Since all paths within a conduit are being measured whether there is user traffic through the path or not, the conduit maintains up to date per-path metrics that are used by the APN to select the best network path to transmit user data.

Dynamic conduits address changes in statically configured networks that are not just slow, gradual changes in network usage, but are happening in real time throughout a day across a network which may be global. In real time, dynamic conduits dynamically optimize network performance adapting to changing communication patterns between nodes in the network. Dynamic conduits can also be used to offload traffic from intermediate nodes that may be experiencing congestion.

An adaptive private network (APN) software product according to the present invention runs as a centralized management system within a virtual machine to create APN configurations and to monitor system resources, analyze system resources, and manage a configured APN in operation as addressed further herein. The centralized management system also includes capabilities that provide discovery, timestamp correlation, and database schema migration processes of the present invention. The APN software of the invention, also referred to as APN virtual machine (VM) software, provides analysis and monitoring capabilities that are timely with respect to events to be tracked and monitored while the APN is in operation and provides storage for historical data as taught further herein. The APN system, also referred to as an APN VM system, reduces the time to configure APN appliances and the number of errors that can occur in configuring a system, as well as, to provide detailed performance data correlated across the WAN. The APN system further allows a centralized virtual single point of control by a network control node (NCN) for a physical network in which the NCN provides system wide timing synchronization. The centralized single point of control is not limited to a central location within a network of nodes, may be at any point within the network, and may be coupled at a point that would be considered outside the boundary of a network. Centralized indicates the single point of control aspects of the APN as described further herein.

An onboard configuration facility is a software component designed to plugin to the APN system of the invention and provide an APN configuration compiler, APN configuration editing capabilities, and to provide an ability to create and edit network maps that show nodes of the APN and conduits between the nodes. Each version of the APNA software produces a version of the onboard configuration facility that understands an object model and configuration options for that version of APNA software. The APN system supports installation of multiple concurrent onboard configuration facility plugins so that a single APN software version can manage a variety of APNA software configuration versions. Each version of APNA software, the appliance code, is provided with a default version of the configuration facility, which is also referred to as a configuration plugin. Multiple configuration plugins may be installed. So, the term "onboard" is in reference to the configuration facility or "plugin" when it is running on the APN VM system or on an NCN.

An onboard configuration editor is a component of the onboard configuration facility that represents an APN configuration as a hypertext markup language (HTML) tree and accepts changes to the APN configuration from a user. The onboard configuration editor is closely coupled with a configuration compiler to make changes to the configuration HTML tree. The onboard configuration editor also integrates with a network map facility to display site nodes in a visual map representation of the APN.

An APN configuration file is a text file which describes a configuration of the APN. This configuration file serves as an input to the configuration compiler which generates registries for each APNA in the network.

The configuration compiler is a software program, such as a Java™ program, that can run on an APN system and converts an APN configuration file into either registries for use by APNAs or into an extensible markup language (XML) representation of the object model for use by the onboard configuration facility.

A configuration package is a software data file which contains the APN configuration file along with metadata. Such metadata includes the network maps that are derived from a specific APN configuration.

An onboard configuration facility package comprises the onboard configuration facility in a format which can be installed onto the APN system.

Adaptive private network appliance (APNA) settings are management settings that can be set directly on an APNA. These APNA settings include time parameters, such as for a time zone or time zones and for network time protocol (NTP) including an NTP server address, settings for a Netflow server, user authentication, simple network management protocol (SNMP), event handling, and periodic status reports. These APNA settings are generally not configurable through the APN configuration file. Rather, the APNA settings are managed on a network-wide basis through the APN controls and software of the invention.

A dashboard, in the context of the APN system, is a user configurable display screen which may be customized to display a subset of items from the rest of the APN system. Multiple dashboards may be created with one being chosen as a default home screen for a particular user.

Workspaces are a construct which allow a user to organize a set of objects, allowing the user to save and recreate a state of a management session. Workspaces are used in a similar manner to use of a "project" in a software integrated development environment (IDE) which collects a set of source code files and associated build scripts and resources such as help text and images to create a complex graphical application.

WAN virtualization, as described herein, enables multiple WAN connections to replace individual private WAN connections, such as Internet WAN links, and perform bandwidth aggregation with improved performance while minimizing impact of WAN links with different or changing latency, jitter, and packet loss metrics.

WAN optimization, as described herein, generally utilizes compression, caching, and other techniques to improve data transfers across a network.

A flow is defined by an n-tuple consisting of <IP source address, IP destination address, IP protocol number, transmission control protocol (TCP)/user datagram protocol (UDP) source port, if the IP protocol is TCP or UDP, TCP/UDP destination port, if the IP protocol is TCP or UDP>. Depending on the context, other items could be added to the tuple including: a differentiated services code point (DSCP) tag, a routing domain, and a service identifier, and the like. Also, a flow is unidirectional. For example, if nodes A and B are communicating, there is a flow that represents traffic from A to B and a flow representing traffic from B to A.

Figure 1B:
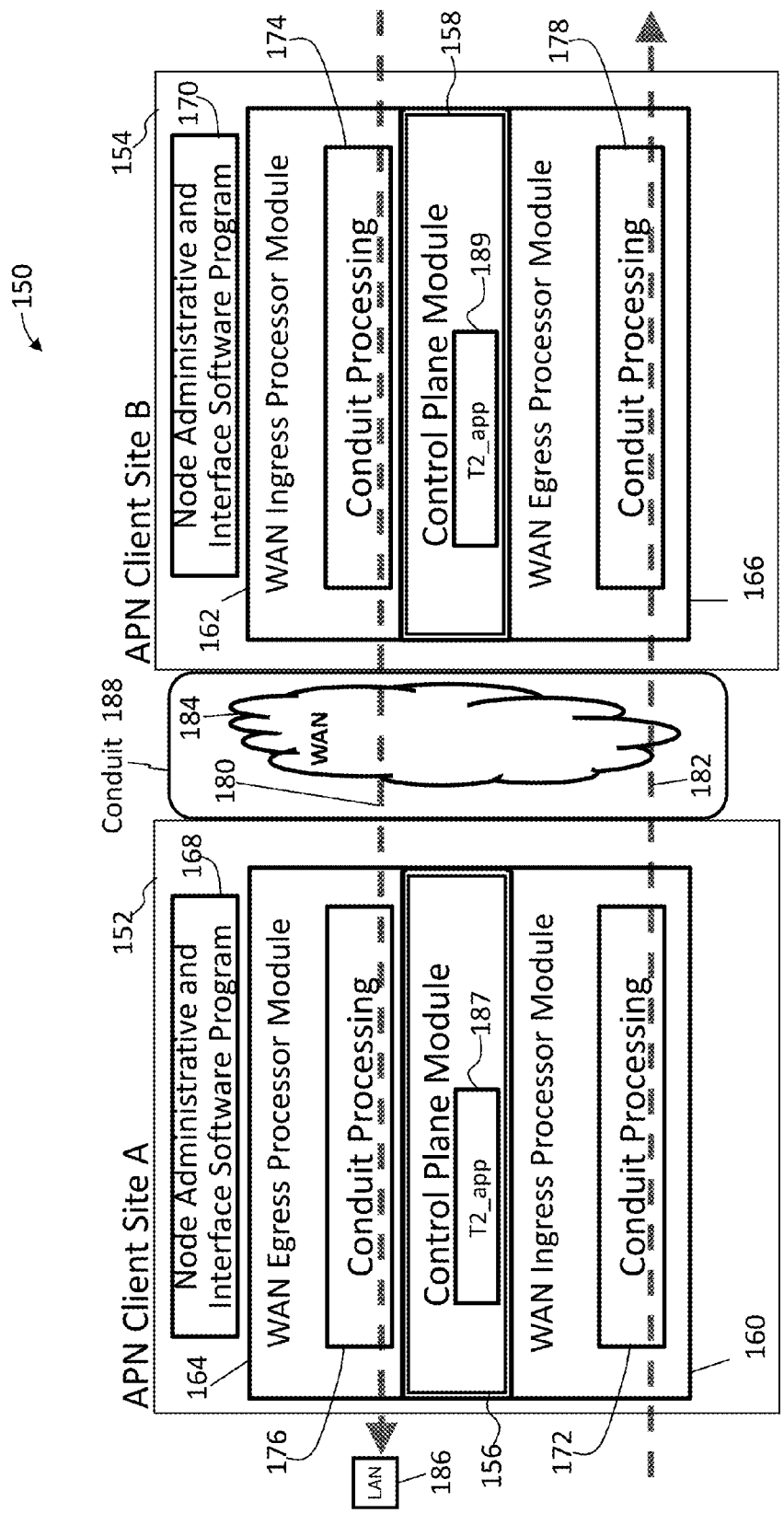
FIG. 1B illustrates an adaptive private network (APN) conduit two-ended service system between a client site A and a client site B in accordance with an embodiment of the present invention.

FIG. 1B illustrates an adaptive private network (APN) conduit two-ended service system 150 between an APN client site A 152 and an APN client site B 154 in accordance with an embodiment of the present invention. Each APN client site is also considered a node in the APN and contains a collection of software modules which govern its participation within the APN. The software modules for the APN client site A 152 and the APN client site B 154 include control plane modules 156 and 158, WAN ingress processor modules 160 and 162, WAN egress processor modules 164 and 166, and node administrative and interface software program modules 168 and 170, respectively. As illustrated in FIG. 1B, the WAN ingress processor modules 160 and 162 include conduit services 172 and 174, and WAN egress processor modules 164 and 166 include duplicate conduit services 176 and 178. Intranet service, Internet service, and pass through service are also provided at each APN client site. Each APN service type, including conduit, intranet, Internet, and pass through service types, implements processes for each type of data traffic that is communicated to and from the WAN respectively.

As illustrated in FIG. 1B, APN conduit traffic, identified by bold dashed arrow paths 180 and 182, flows through the two APN client sites 152 and 154 as the traffic traverses the APN. WAN ingress processing module 162 of APN client site B 154 performs the WAN ingress conduit service processing 174 prior to transmitting the traffic 180 via the WAN 184 to the APN client site A 152. WAN egress processor module 164 of the APN client site A 152 performs the WAN egress conduit service processing 176 prior to transmitting the traffic 180 to the node or nodes located on LAN 186. The binding of one APN client site's WAN ingress conduit processing 174 to the peer APN client site's WAN egress conduit service processing 176 constitutes an APN conduit 188 in which traffic is actively monitored and managed across multiple WAN resources. The t2_apps 187 and 189, described in more detail below, are control programs that run on each APNA communicating with other APNAs in the APN while forwarding user data.

The APN is capable of using disparate asymmetric WAN links which frequently vary in behavior with respect to bandwidth, latency, jitter, packet loss and congestion over time. For example, the APN can use an asymmetric DSL WAN link that transmits data at 512 kbps upstream to the WAN and 6 Mbps from the WAN through the public network combined with a private symmetric leased circuit T1 WAN link that transmits data at 1544 kbps upstream and downstream and a cable broadband connection that transmits data at 312 kbps upstream to the WAN and 3 Mbps from the WAN to a peer having adequate aggregation bandwidth of these rates for a single transmission control protocol (TCP) file transfer session at a theoretical transmit rate of 2368 kbps and receive at 10544 kbps or 10.544 Mbps. Practically, under good network behavior, the actual rate would approach 90% of these rates. If the behavior of the connection was to change, for example the paths to the DSL link were to have dramatic levels of loss, the APN would, using its high frequency performance feedback mechanism, adapt the network to avoid or mitigate the issues by using alternative resources or attempting to recover from the loss.

In path selections, conduit paths are evaluated and the best available path is selected. Any paths currently in a path quality good state are eligible to be chosen first. If multiple paths are in a path quality good state, then an estimated end to end time is evaluated and compared for each path, and the path with the lowest end to end time is chosen. If no path is in path quality good state, then a path with the highest bandwidth path quality bad state is chosen. A "one way time" (OWT) refers to the amount of time it takes for a packet to traverse a network from source to receiver. In the context of this invention, the one way time is measured by subtracting a receive time stamp from a WAN egress module 166 from the send time stamp from a WAN ingress module 160, FIG. 1B.

Figure 1C:
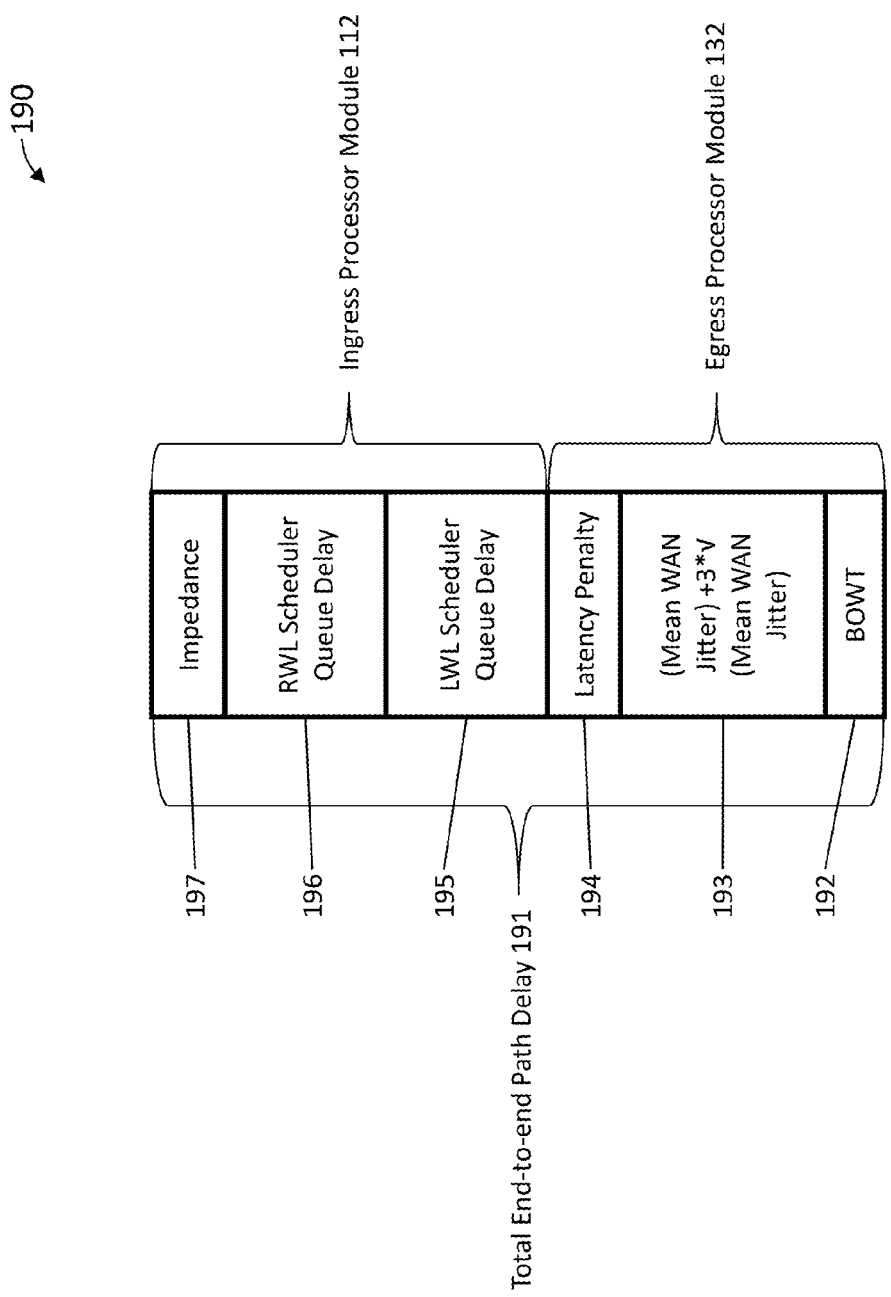
FIG. 1C illustrates exemplary factors used to determine the total end-to-end path delay in accordance with an embodiment of the present invention.

FIG. 1C illustrates exemplary factors 190 used to determine the total end-to-end path delay 191 in accordance with an embodiment of the present invention. The term "best one way time" (BOWT) refers to the lowest measured OWT for a particular packet on a particular path over a period of time. Initially, the evaluation process chooses one best path based on path latency which is calculated using a best one way time (BOWT) 192, mean WAN jitter 193, latency penalty for short term instability 194 and WAN link schedulers' queue delay times 195 and 196, with additional preferential treatment referred to as impedance 197 applied to any prior primary path for the APN traffic flow, if a primary path exists. Thus, an exemplary formula for estimating total end-to-end path delay is the BOWT 192+(mean WAN jitter 193)+3*(√(mean WAN jitter 193))+latency penalty 194+local WAN link (LWL) scheduler queue delay 195+remote WAN link (RWL) scheduler queue delay 196+impedance 197. The BOWT 192, mean WAN jitter 193, and latency penalty 194 are provided by a remote APN conduit state resulting from control messaging from the egress processor module 166 of FIG. 1B. The local WAN link scheduler queue delay 195, remote WAN link scheduler queue delay 196 and impedance 197 are provided by the WAN ingress processor module 160 of FIG. 1B. U.S. Pat. No. 8,125,907 filed on Jun. 11, 2009 entitled "Flow-Based Adaptive Private Network with Multiple WAN-Paths" and incorporated by reference herein in its entirety provides further exemplary details of a presently preferred approach to timing and network control in an adaptive private network (APN) at col. 6, line 1-col. 19, line 27, for example.

APN path processing services are responsible for providing a means of communicating user data and control information from one APN node to another APN node across the network. In particular, user data and control information may be transmitted from the WAN ingress processor module 160 of one APN node across the WAN and received at the WAN egress processor module 166, as shown for example in FIG. 1B. Exemplary APN path services which may suitably be provided are listed below:

1. Universal path tagging of all conduit traffic sent across the WAN with high resolution and highly synchronized APN time stamps to enable the highly predictive estimation of transmission latency and statistical variation of latency, subsequently in parallel, a control plane module's path state monitoring service is used to detect optimal paths for traffic to use across the APN.

2. Use of the above optimal path identification to provide, in tandem with a WAN link accounting module, WAN bandwidth reallocation from low performing paths to higher performing paths.

3. Universal path tagging, of all conduit traffic sent across the WAN APN path with path sequence numbers, enables sub second detection of packet loss enabling fast retransmission of user packets with little to no negative effect to the end users.

4. Continual monitoring of and characterization of network behavior at times of lower utilization using heartbeats for fast reaction when network demand does arrive, such as provided by a heartbeat generator.

5. The ability to identify and proactively solicit retransmission when network traffic has been extraordinarily delayed or if the network has ceased to function using a Nag method, as provided by a Nag process, operating on the path state monitoring module.

6. Universal path tagging of all conduit traffic with network utilization and non-utilization of WAN link resources enabling early detection and avoidance of network congestion prior to the packet loss that is typical of normal TCP like congestion methods.

7. The ability to transmit time sensitive control messages without typical internal scheduling delays for software process staging to rate schedulers, while still maintaining proper long utilizations to the APN network to do retransmission of lost packets without the highly predictive estimation of transmission latency and statistical variation of latency.

The APN client node uses timing data to adjust or calibrate a network time by using a linear algebraic calculation based on the slope-intercept form. In a current implementation, y is the time at an APN control node, also referred to as a network control node (NCN), and x is the client node local time, b is the base offset between the two, and m is the rate of change of y versus x which is the slope. Using these definitions, an equation in slope-intercept form y=mx+b is expressed as network time=slope*client local time+base.

The slope is calculated by taking two samples over a pre-specified period and averaging the samples together. The base offset is calculated by taking the difference of the value between the network control point time and the client time, adjusted for one half round trip time (RTT).

Using queuing theory, Poisson distribution assumptions, and a highly accurate APN wide APN clock sync that allows for accurate one way time measurement, a method is provided that is typically capable of estimating path latency and statistical jitter with an accuracy approaching ~99%. An equation which may be suitably used is best one way time (BOWT)+(Mean WAN Jitter)+3*($\sqrt{}$(mean WAN jitter)). This equation provides a very accurate inference with just a few samples of traffic over a short period.

A path state represents the most current condition of the network path as determined by feedback received by the WAN egress APN node's path state monitoring process. As packets are received, the sequence numbers of the packets are tracked to see if any packets were lost in transit between the WAN ingress APN node and the WAN egress APN node. A method is used to trigger path state transitions that are biased toward more tolerance for loss in the short periods of packets received with substantially less tolerance of loss over longer periods. A unique aspect of this approach is the ability to track the path's packet loss thresholds over numerous durations nearly simultaneously and continually while still maintaining low processor overhead. This aspect is obtained through the universal path tagging of conduit traffic sent across the WAN with high resolution and highly synchronized APN time stamps to enable the highly predictive estimation of transmission latency and statistical variation of latency. In tandem, a control plane module's path state monitoring service is used to detect packet loss and optimal paths for traffic to use across the APN. The result is an ability to detect a difference between occasional incidental short term network loss and long term persistent problems.

In a presently preferred embodiment, the APN node's software modules at a client site are stored and operate in the same physical APN appliance; however, the modules may also exist in separate physical APN appliances in alternative embodiments. The methods described in connection with the embodiments disclosed herein may be embodied directly in one or more software modules executed by a processor and memory complex such as utilized in an adaptive private network (APN) appliance (APNA), a rack mounted processing device, a personal computer, a server, or the like, having one or more central processing unit devices. The processor and memory complex, for example, may be configured to execute instructions that access data and operate on data under control of a software module program stored on a computer readable non-transitory storage medium either directly associated locally with the processor and memory complex, such as may be available through an instruction cache, or accessible through an I/O device. A software module may reside in a computer readable non-transitory storage medium which may include random access memory (RAM), flash memory, dynamic random access memory (DRAM), synchronous dynamic random access memory (SDRAM), read only memory (ROM), programmable read only memory (PROM), erasable programmable read only memory (EPROM), electrically erasable programmable read only memory (EEPROM), hard disk, a removable disk, a CD-ROM, digital video disk (DVD), other types of removable disks, or any other suitable non-transitory storage medium. A non-transitory storage medium may also be coupled to the processor and memory complex such that the hardware processor can read information from, and write information to, the storage medium over an intranet or the Internet.

An adaptive private network node (APN client site) contains software modules supporting participation in an adaptive private network. An APN node may exist in one or more APN appliances at a location. An APN node contains a collection of software modules executed by a processor and memory complex located in the APN node which govern the APN node's participation within an APN such as control plane modules 156 and 158, WAN ingress processor modules 160 and 162, and WAN egress processor modules 164 and 166 in FIG. 1B. The control plane module is responsible for controlling and participating in the control of the APN node in tandem with other APN nodes in the network.

The WAN ingress processor module 160 may suitably be embodied as software and hardware components responsible for processing network traffic for transmission from a local area network (LAN) to a WAN. The WAN egress processor module 164 may suitably be embodied as software operating on hardware components, such as a processor and memory complex that is responsible for processing network traffic for transmission from a WAN to a LAN. WAN ingress and WAN egress processor modules are discussed in further detail below. The APN client site's control plane module 156 may suitably be embodied as software operating on hardware components, such as a processor and memory complex that utilizes the APN client site's WAN ingress processor module 160 and WAN egress processor module 164 as the means for transmitting and receiving APN node to APN node control data across the WAN.

Software packages for an APN are distributed through the WAN using control packets, termed Tapplication protocol (TAP) packets, that are utilized as part of change management software or through administrative interfaces, such as downloading software using interfaces 168 and 170 to the APN client sites. The TAP is a protocol for messages that are sent through the WAN to allow processes outside of t2_app on different appliances to communicate with each other. TAP can be considered to operate as a point-to-point or Ethernet like device which, instead of receiving packets from physical media, receives the packets from a user program and instead of sending packets via the physical media, writes the packets to the user program. After a software update, the APN services on the APN client sites 152 and 154 are then restarted thus bringing the APN software node configuration into synchronization.

Figure 2:
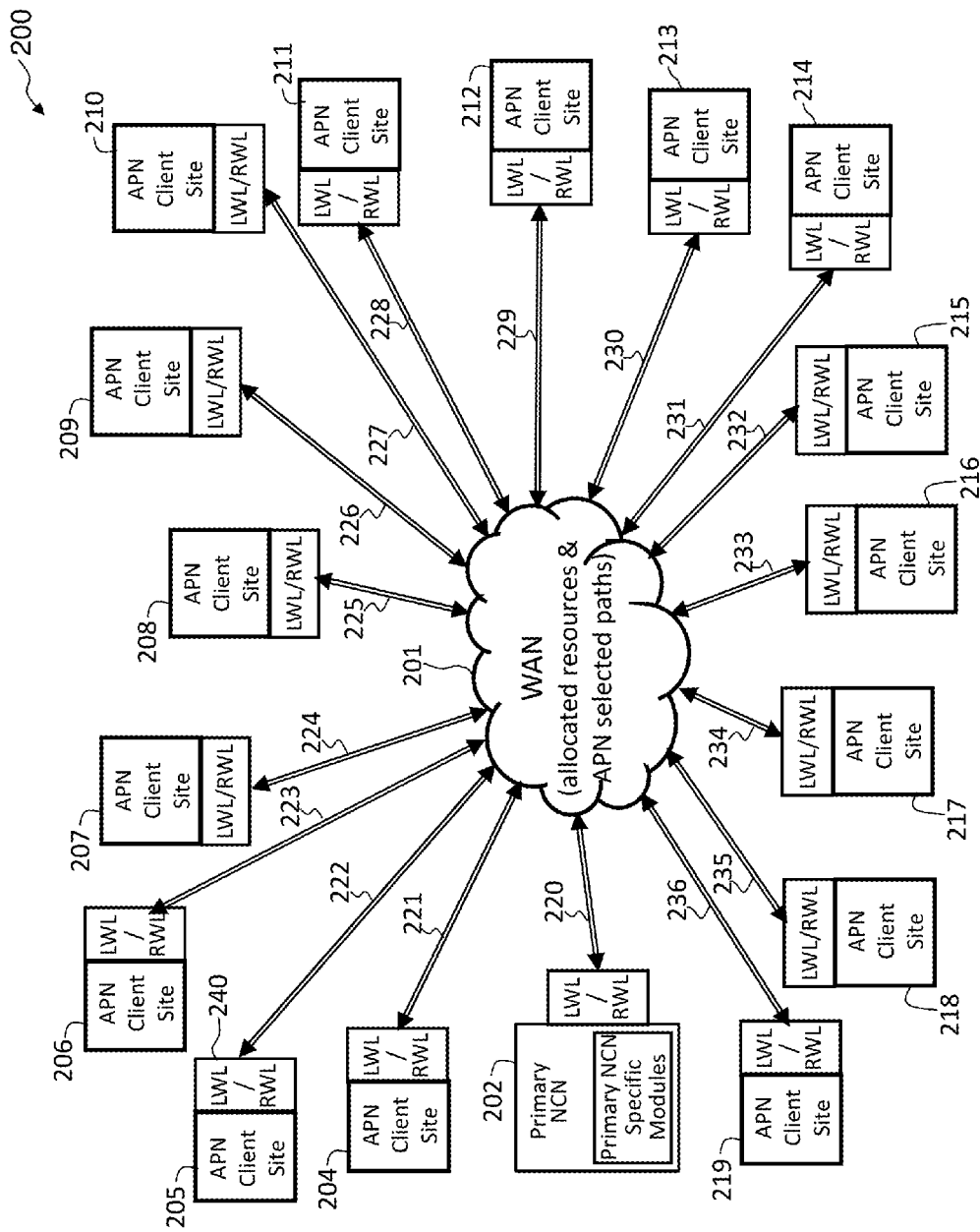
FIG. 2 illustrates an APN having an APN network control node (NCN) and sixteen APN conduits coupled to sixteen APN client sites in accordance with an embodiment of the present invention.

FIG. 2 illustrates an APN 200 having an APN network control node (NCN) 202 coupled to conduit section 220 and sixteen APN conduit sections 221-236 coupled to sixteen APN client sites 204-219, respectively, in accordance with an embodiment of the present invention. As illustrated in FIG. 2, in a presently preferred embodiment, APN 200 is centrally configured. A network administrator configures the entire APN 200 through an APN configuration file that is processed by the NCN 202. The NCN 202 then distributes the configuration settings to all client sites in the APN 200. This method of configuring the APN 200 is intended to provide benefits to the administrator by providing a single point of configuration to the network. It also assures configuration consistency and compatibility for all APN client sites in the network nearly simultaneously, with strict version checking. In a presently preferred embodiment, an intensive configuration audit and validation is done to the configuration prior to that configuration being applied to the network. This audit greatly decreases risks of invalid configurations being placed on the production network. The central configuration also provides for additional configuration bandwidth optimization for the network, by doing a mapping of the APN resources and their initial allocations. Furthermore, the centralized configuration can provide information and warnings to the administrator as to the behavior of the configuration that may not be obvious or intended from the configuration, before loading the configuration onto a production network.

Each of the sites 204-219 and primary NCN site 202 contains an APN appliance to provide APN functionality. The configuration of the APN 200, generally provides for connectivity between a site A, such as site 205, and for a site B, such as site 208, where the connectivity from the site A's perspective is site A→LWL→"WAN"→RWL→site B. The connectivity from the site B's perspective is site B→LWL→"WAN"→RWL→site A. The WAN 201 represents allocated WAN link resources and APN selected paths. In FIG. 2, a conduit between a site A and a site B is formed by use of the conduit sections 222 and 225 and is a virtual connection between the corresponding site A and site B. The conduit includes a collection of paths and encompasses a path from a local WAN link (LWL) at site A→"WAN"→RWL at site B.

In one presently preferred embodiment, APN conduits exist between the NCN and, for example, sixteen APN client sites as shown in FIG. 2. It will be recognized that while sixteen APN sites are shown for purposes of illustration, a larger or smaller number of potential APN client sites may be suitably employed. Each APN conduit may have the unique configuration parameters tailored by an administrator for the particular needs of each geographic location associated with a particular APN.

For a definition of APN path states, a description of path processing services is provided below. Any paths currently in a path quality good state are eligible to be chosen first. If multiple paths are in a path quality good state, then an estimated end to end time is evaluated and compared for each path, and the path with the lowest end to end time is chosen. If no path is in a path quality good state, then a path in a path quality bad state with the highest bandwidth is chosen.

The sixteen client sites 204-219 of the exemplary APN 200 are generally located remotely from each other and may include geographically diverse client sites. A site would be defined as remote if the devices are physically in different locations such as different buildings, cities, states, time zones or countries. For example, the primary NCN 202 may be located in a company's headquarters location in a first country with client sites 204-209 and client sites 217-219 also located in the first country. The other client sites 210-216 may be located in a second country.

As used herein, an APN appliance is a device that contains APN node functionality according to software modules, such as the control plane modules 156 and 158, the WAN ingress processor modules 160 and 162, and the WAN egress processor modules 164 and 166, as described in more detail above with reference to FIG. 1B. The sixteen client sites 204-219 are coupled by conduit sections 221-236, respectively, and the conduit sections may be connected together to provide a configurable virtual connection between two connected APN appliances at the client sites. It is noted that while sixteen client sites 204-219 are illustrated, an APN may support as many client sites as are required.

A network control point (NCP) 202 of FIG. 2 is an administration point for the APN 200. In one embodiment, the NCP 202 resides within an APN node. An APN control node refers to an APN node that also performs as the network control point of the APN. In another embodiment, an NCP resides in an appliance that is separate from an APN node and administers and controls the APN nodes within the APN. The NCP provides administrative and control functions to the APN, including but not limited to, distribution of configuration objects to APN client nodes and time synchronization to the APN.

A dynamic conduit is a conduit created between APN clients when needed and can be removed when no longer needed, based on a configured first threshold and a configured second threshold. For example, client site 205 can be configured with two local WAN links, one from a first network provider and one from a second network provider. Multiple conduits may be connected to site 205 which may be configured to use one or both of the local WAN links. In an exemplary scenario where all of the conduits that are connected to site 205 use both local WAN links, then when usage for either local WAN link passes the configured second threshold, creation of a dynamic conduit can be triggered. The first and second thresholds refer to bandwidth levels passing through an intermediate site.

Software code referenced as t2_app provides processes that forward data traffic and control protocols related to conduits. The t2_app software is described in further detail below and shown as element 315 in FIG. 3 and element 522 in FIG. 5.

An APN traffic flow is the administrator designation for network session traffic that is identified to a particular APN flow record. APN traffic flow requirements are administrator-configured requirements that govern an intended behavior of an APN as it pertains to an APN traffic flow. For example, APN traffic flow requirements may comprise a persistent path flow requirement, a duplication flow requirement, and a reliable flow requirement.

An APN flow record is held in the memory of an APN appliance. An APN flow record tracks a defined APN traffic flow, ensuring that the APN traffic flow's prior-configured requirements are followed. The APN flow record contains both the APN traffic flow requirements and the APN traffic flow's state. The requirements of a particular APN flow record are derived from the routes and service rules that the APN traffic flow matches. The state of APN flow record includes, but is not limited to, APN service type, APN service instance, information pertaining to the last APN path selected, current APN flow sequence number, time of last packet received, time of last packet transmitted, counts of number of packets and number of bytes processed, sets of pending packets for sequence reordering, sets of pending packets for fragmentation, and sets of historical records for packets previously processed.

An embodiment of the invention applies a method for including a routing stack to provide a timely way to learn about routes for an end to end system in the context of an adaptive private network. Routes are updated and distributed appropriately within the end to end system during network ups and downs, allowing customers to no longer have to statically configure routes.

For example, since the APN is monitoring the quality and topology of the WAN links, the APN is able to adjust routes based on information gathered through the monitoring process. If the quality of a conduit is bad enough, such as having very high loss, for example, the APN can adjust the routes at a local site to avoid that bad quality conduit. Advantageously, the APN is also able to inform external equipment of the route changes.

An embodiment of this invention, also, advantageously provides a simpler configuration model for users. In addition to managing a plurality of static routes, users would often need to add special policy based routes to the routers around the APNA to force WAN traffic to go to the APNA. This invention removes that requirement allowing the APNA to automatically announce to the surrounding routers what WAN traffic it can handle. This approach allows traffic to be steered into the APN automatically when the APNA is operational.

Lastly, when a user adds a new subnet onto a router near an APNA, that router can announce that subnet to the APNA and then that APNA can inform other nodes of the APN of the new route. That information can be propagated to local routers at remote sites. So the user makes one adjustment to one router and their entire network is able to direct traffic to that subnet. Prior to this invention, the user would typically have had to make adjustments to the APN configuration and to the configuration of the routers at remote sites, which included possibly hundreds of impacted routers. Supporting the learning of routes and changes to routes is only one aspect of the invention. By allowing learned routes to be assigned different services based on APNA filter rules, the APN can manage traffic through the WAN as desired.

For example, in general, routes have no context. A route is configured to send traffic for some set of addresses to a specified node. The route does not contain information directing the traffic, such as to go across a WAN or stay local to a site. Mapping routes to APN services allows the APNA to know the context of the route. For example, a user might have two private networks that use a private WAN link to provide a physical access point to non-public WAN destinations, such as by use of a multiprotocol label switching (MPLS) tunnel. Those two networks each have their own WAN link that supports intranet services, such as ATT-intranet and Verizon-intranet. Those WAN links also support conduit services. Further, the APN configuration allocates bandwidth for the conduit and intranet services so that they share the bandwidth according to the business needs. Understanding the service used for a route, means that the APN can determine which WAN link is being used by traffic through that route and which service to count that traffic against. Without this context, it would be possible for traffic for one service to consume too much bandwidth and harm the quality of service (QoS) sharing that WAN link.

Figure 3:
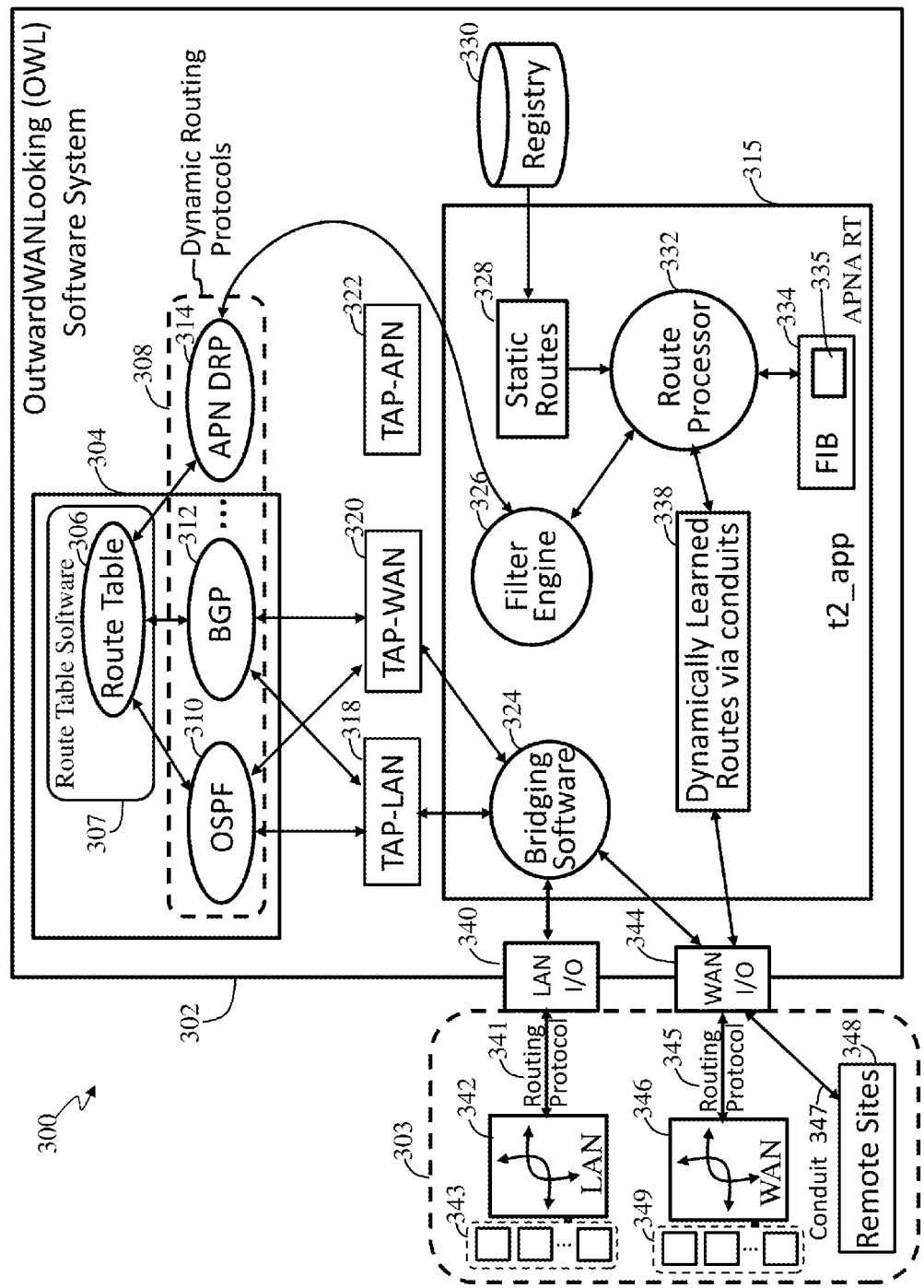
FIG. 3 illustrates a dynamic routing system for accessing dynamic routing information from local area networks (LANs) coupled to a wide area network (WAN) to determine optimized end-to-end routing paths in the context of an adaptive private network (APN) in accordance with an embodiment of the present invention.

FIG. 3 illustrates a dynamic routing system 300 for accessing dynamic routing information from local area networks (LANs) coupled to a wide area network (WAN) to determine optimized end-to-end routing paths in the context of an adaptive private network (APN) in accordance with an embodiment of the present invention. The dynamic routing system 300 includes an outward WAN looking (OWL) software system 302 that provides dynamic routing for an end-to-end network 303 comprising one or more LANs 342, at least one WAN 346, and one or more remote sites 348. The dynamic routing system 300 supports learning of routes in the end-to-end system including routes that change during operation of the end-to-end system and also supports the distribution of routing information to routers in the end-to-end system.

To support the end-to-end network 303, a third party open source dynamic routing daemon, entitled BIRD 304, is integrated in each APNA in the APN. BIRD 304 uses an internal route table 306 and route table software 307 that are connected to supported communication protocols. BIRD 304, as a routing daemon, is a computer program that runs in the background to communicate with routers, to gather route table information from the routers, to calculate internal routing table entries, and to send routing information to another program which forwards packets according to the provided routing information. The integration of BIRD 304 with APNA software allows the determined APNA routes to be advertised in an autonomous system external (type 5) or router (type 1) link-state advertisement (LSA) to other open shortest path first (OSPF) routes or as border gateway protocol (BGP) route updates depending on the configuration of the end-to-end network 303 for the determined routes. A link-state advertisement communicates a router's local topology to other routers in the same OSPF area, which is a logical grouping of routers in a local network. Routes that the BIRD routing process learns from OSPF or BGP are copied and sent to t2_app 315 and distributed throughout the APN using APN processes.

Advertising a route change is specific to how individual routing protocols work. Fundamentally, announcing a new route involves sending a message to the BIRD core that subnet A, for example, is available through the APN network interface with cost C and often with a few other attributes, such as a routing domain. BIRD then integrates that information into a routing table and uses an internal API to inform other routing protocols about those updates to the routing table. A technique to remove a route works in a similar manner, where a message is sent to BIRD and BIRD propagates changes to the routing table to other protocols. When a route change is advertised, that means that the route change information is sent to and received by routers that are peered with the APNA, and those routers update their local routing tables to reflect the change in network topology.

The OWL software system 302 learns about a current configuration of the end-to-end network 303, changes routes in the end-to-end network 303, supports BGP and OSPF, advertises t2_app generated routes through OSPF and/or BGP, supports adding filtering for routes by use of a configuration editor, supports configuration of OSPF and/or BGP parameters that are required for setting up adjacency, supports logging, collection of route statistics, among other operations. The OWL software system 302 makes it easier for a user to configure routes in the end-to-end network 303 by providing a way to learn and advertise routes in the end-to-end network 303 and adapt to route changes automatically. On each site, a routing protocol is configured, such as OSPF or BGP, to announce route changes through the network. Routers generally provide a technique to expose routes learned from one protocol into another protocol. This technique is referred to as route redistribution which is leveraged by making the APN appear as a routing protocol and redistributing the APN routing information into these other protocols. These other protocols then use their normal methods to announce new or removed routes through the network.

The BIRD 304 comprises route table 306, the associated route table software 307, and a set of dynamic routing protocols 308 which is expanded in the OWL software system 302 to include an adaptive private network (APN) dynamic routing protocol (DRP) 314. The set of dynamic routing protocols 308 includes the open shortest path first (OSPF) 310, the border gateway protocol (BGP) 312, the APN DRP 314 and other dynamic routing protocols according to system requirements. The OSPF 310 dynamic routing protocol uses a link state algorithm that operates within a single autonomous system. The BGP 312 dynamic routing protocol, supports an internal BGP (iBGP) and an external BGP (eBGP) dynamic routing protocols. The iBGP is designed to exchange route information within one autonomous system. The eBGP is designed to exchange route information between different autonomous systems. The APN DRP 314 is notified when routes learned via the OSPF 310 and the BGP 312 are added into or removed from the route table 306. The APN DRP 314 translates the learned routes into t2_app format, and sends the learned routes through a software application programming interface which is termed a socket to the APNA software t2_app 315.

The updates to the route table 306 are redistributed, and in the redistribution process, the APNA filter rules map routes to a service based on the needs of the user. The APNA filter rules also allow the priority of routes to be determined. Routing protocols have some notion of cost, or other metric, of a route. Routers generally select a lowest cost route as, many times, that represents the best path through the network. Unfortunately, there is no way to compare an OSPF cost to a BGP cost in any meaningful way. So, the APNA filter rules map an OSPF or BGP cost to an APN cost, for import rules, and an APN cost to an OSPF or BGP cost, for export rules. The APNA software is configured to provide a variety of operators to create rules for matching on selected routes. For example, a rule may be configured to specify whether a selected route should be ignored or not ignored and how to handle the cost of the selected route.

An example of a route import filter addresses a scenario where an enterprise defines all or a large portion of all of their internal IP addresses in a large address space, such as defined by 10.0.0.0/8. A site A in the enterprise's network is assigned to use addresses in the range 10.1.0.0/16, which is a subset of 10.0.0.0/8. Other sites in the network receive their own subset of 10.0.0.0/8, and none of these subsets overlap with each other. In this scenario, a route import rule can be added to the site A configuration that maps 10.1.0.0/16 to a local service type and maps 10.0.0.0/8 to an intranet service. The rules would be ordered by the user so that 10.1.0.0/16 is checked before 10.0.0.0/8. With this configuration, the adaptive private network appliance (APNA) at site A can easily determine which traffic uses intranet WAN services and which traffic stays local to the site.

Another example is that an APNA may learn about a new route added to the network from two different routers. Suppose that the APNA is communicating with an OSPF router on the LAN side of the site and a BGP router on the WAN side of the site. It is possible that the BGP router has a network path to the subnets controlled by the OSPF routers, assuming the APNA learned those routes from the OSPF network, and the BGP router will publish that to the APNA. In cases like this, the APNA can be configured to ignore those routes when they come from the BGP router since the OSPF information is authoritative and the path through the BGP router is less efficient. Such a configuration can then be setup with a rule to ignore information about a subnet when it comes from a particular router, such as the BGP routers in this scenario. Alternatively, the APNA could be configured to allow the route information to be imported and also set a metric on the route such that OSPF information is always preferred.

The route export filters are mainly used to control the cost of routes that the APNA can service over the WAN. The intent is for routes that can be serviced by the APNA to appear to have a lower cost so that the OSPF routers at a site steer WAN traffic to the APNA. The user, for example, can control the route export filters to set the cost to an appropriate value to make this happen.

The t2_app 315 filters the new learned routes and stores the filtered routes in the forwarding information base (FIB) 334. Going the other way, the t2_app 315 sends new routes it has learned to the APN DRP 314 via the same socket noted above. Once the APN DRP 314 receives those new routes, it adds those routes into the route table 306. The OSPF 310 and the BGP 212 are notified by the route table software 307 to update the nodes in their neighborhood with the new route information. Generally, the route table software 307 takes the routes learned from a DRP of the set of dynamic routing protocols 308, combines the routing information into the route table 306, finds the best route, and notifies enabled protocols about route changes.

During a t2_app 315 start up time, the t2_app 315 sends known routes, such as stored active routes, to Bird 304. Then, the t2_app 315 updates Bird 304 when new routes are added or routes removed. In the other direction, when Bird 304 starts up, BIRD 304 sends known routes, such as stored active routes, to the t2_app 315. Then, BIRD 304 updates the t2_app 315 when new routes are added or routes removed. Also, if there is a network configuration change, or a high available standby t2_app becomes active, the t2_app 315 also can send a message to Bird 304 to force Bird 304 to resend all known routes to the t2_app 315. For example, a message with type ROUTE_MESSAGE_TYPE_RESEND_ROUTES is shown in Table 1 to execute the resend operation.

The t2_app 315 is a program that also provides processes that forward data traffic and control protocols related to conduits. Exemplary t2_app code currently consists of five directories: including control, forward, manage, platform_api, and common, though not limited to this number of directories. The control directory holds code related to control protocols used by t2_app 315 for conduits. The forward directory contains code that is responsible for moving packets through the system. The manage directory has code that deals with management plane modules, including the control plane modules 156 and 158. The platform_api directory includes code that is responsible for interfacing with the hardware, such as the WAN ingress processor modules 160 and 162 and the WAN egress processor modules 164 and 166, and the common directory has code which is not specific to any of the other directories.

The control directory includes code associated with an APN memory subsystem, which is a distributed shared memory system that allows a data structure on one appliance to be pushed over a conduit to an appliance on another site. A conduit path manager deals with sending and receiving transmission quality reports (TQRs) between sites. The TQRs are sent using the APN memory subsystem. A geographically diverse process handles a state machine controlling a primary NCN and secondary standby NCNs in geographically diverse regions. The t2_app 315 also handles flows in the system. The flows are stored in a hash table and references are counted so that it is known when it is safe to free a flow data structure. As packets are passed through the t2_app 315, they hold a pointer to the flow so flows are not freed until it is known that there are no more users of that flow in the system. For a conduit to work properly, it is important that both ends of the conduit have the same notion of time. The t2_app 315 provides a time synchronization protocol that is implemented in each node of the APN system. The t2_app 315 also provides a process for tracking of traffic usage on a WAN link. In particular, this tracking process includes a task that wakes up every 100 ms, for example, and examines the current allocation of bandwidth on a WAN link and compares it to the actual usage. The data provided by this tracking process allows the bandwidth to be adjusted regularly so that demand can be met. The t2_app 315 also implements a versioning protocol that sites use to make sure they are compatible before bringing up a conduit. This protocol is leveraged to do a key exchange and to rotate encryption keys while the conduit is in operation.

The t2_app 315 also implements a high availability (HA) protocol between two appliances serving a site, one an active APNA and the other a standby APNA. All the learned routes on the active APNA are also sent from an active APNA routing table (RT) 335 to the standby APNA and stored on the standby APNA routing table 335 during normal operations of the active APNA. When an HA failover occurs due to the active APNA going down, for example, any outage that occurs is advantageously very brief because the standby doesn't need to relearn the routing table. Upon the standby APNA receiving notification that the previously active APNA is returning to active status, all the learned routes of the current configuration are sent from the standby APNA routing table 335 to the active APNA and stored on the active APNA routing table 335 during normal operations of the standby APNA.

Various operations use customizable rules which are processed by the t2_app 315. Further, the t2_app 315 processes routes by using a route cache so that once a route has been determined and stored in the route cache, the t2_app utilizes a hash based lookup to search for the route and associated information in the route cache. In one embodiment, route caches are local to a thread so that locking does not need to be done, resulting in fast route lookups. A version number is kept on a main route database and incremented, for example, anytime a change is made to the route table. Many parts of the APNA's data pipeline cache route lookup results. The version number is checked to allow these cache entries to be invalidated when a change is made to the route table. This approach allows threads to detect when their route cache has data that is out of date.

The manage directory provides for processes in the APNA which support sending of commands to the t2_app 315 to perform actions or retrieve information. These actions can include enabling or disabling paths or conduits, pinging an address, or notifications about changes to the system made by the management tools, and the like. A rich debug interface to t2_app 315 is also provided. The t2_app 315 also provides a way for applications external to the t2_app to send commands to a remote site through the conduit, which is used, for example by change management processes. The t2_app 315 provides support for the NCN to distribute learned public IP addresses to other sites to enable client to client conduit communications when both clients are behind a network address translation (NAT) and the public IP address is not known in advance. This mechanism uses the APN memory subsystem to distribute the messages. The t2_app 315 further supports client operations to inform the NCN of their management IP address. This approach support allows a user interface on the NCN to provide links to navigate to a client appliance. It also allows an APN VM system to discover the management IP addresses of all appliances in the network when it communicates with the NCN.

The forward directory provides support for ingress and egress conduit service processing. The t2_app 315 is configured according to a multi-threaded pipeline model, wherein each stage of processing is accomplished in a separate thread. The threads hand off packets to each other through queues. The multi-threaded architecture of t2_app 315 allows platforms with multiple CPUs to spread the processing of a packet across the multiple CPUs, which allows performance of the t2_app 315 to scale as more CPUs are made available.

In the APNA, the t2_app 315 uses FIB 334 to find the best route to forward traffic to destination sites. The routes in FIB 334 come from user configured static routes 328, from dynamically learned routes in the route table 306 through filter engine 326, and from dynamically learned routes via the conduits function 338 from conduit sources, such as remote sites. The t2_app 315 obtains the dynamically learned routes from the route table 306 through the use of the APN DRP 314 which pushes any received route table updates to filter engine 326. The APN DRP 314 registers a callback function to route table 306 whenever there is a route update, such as an addition or deletion. The callback function is called and the APN protocol then creates messages with that route information in it which are then sent to t2_app 315 via a socket. For example, when the OSPF 310 learns about a route update, the OSPF 310 informs the route table software 307 to update the route table 306. The APN DRP 314 receives the route update from route table 306, such that a routing table for the APN, APNA routing table 335 stored in the FIB 334, is then in sync with the route table 306. The t2_app 315 polls on the socket for new messages from the APN DRP 314. Once a message is received from the socket, the filter engine 326 filters those routes received in the message and then updates the FIB 334.

To allow the dynamic routing protocols, such as OSPF 310, BGP 312, and APN DRP 314, to communicate with other routers, the t2_app 315 creates TAP-LAN 318, TAP-WAN 320, and TAP-APN 322, interfaces which serve as communication pipes between two processes. For example, TAP-LAN 318 serves as a communication pipe between the OSPF 310 and BGP 312 dynamic routing protocols and bridging software 324 to communicate with LAN side routers.

The TAP-WAN 320 serves as a communication pipe between the OSPF 310 and BGP 312 dynamic routing protocols and bridging software 324 to communicate with WAN side routers. Bridging software 324 is a software module in t2_app 315 that is used to act as a switch to forward traffic from one Ethernet interface to another Ethernet interface. For example, packets read from a TAP interface by the t2_app 315 are then forwarded out a proper LAN port by bridging software 324. For incoming packets, that are of interest to the dynamic routing protocols, such as address resolution protocol (ARP) replies, multicast messages, unicast OSPF messages, are forwarded to the proper TAP interface by bridging 324. The TAP-APN 322 interface is described in further detail below.

The LAN I/O 340 is an Ethernet interface connecting to LAN 342. The WAN I/O 344 is an Ethernet interface connecting to WAN 346. LAN routers 343 and WAN routers 349 use routing protocols 341 and 345 to exchange route information with dynamic routing protocols OSPF 310, BGP 312 in Bird 304. Routing protocol instances running inside Bird, such as OSPF 310 and BGP 312, learn about routes in the LAN from the LAN routers 343. Routing protocols, such as the OSPF 310 and the BGP 312, learn about routes in the WAN from the WAN routers 349. Those learned routes are then sent to the APN DRP 314 and further sent to the t2_app 315. For example, the t2_app 315 route information, such as obtained from the dynamically learned routes via conduits function 338, is sent to the APN DRP 314 and then added to the route table 306. By accessing the route table 306, the OSPF 310 and BGP 312 are able to advertise the learned conduit routes to the LAN routers 343 and WAN routers 349 they have access to.

Advantageously with embodiments of the invention as described herein, users don't need to configure static routes in the t2_app 315 since the t2_app 315 is able to learn the network topology automatically and dynamically from the connected routers. When network topology changes, no user intervention is needed, it can adapt to the new topology dynamically. Static APN routes may or may not be active. So if a conduit goes DEAD, any routes that point to that conduit are marked as inactive. For routing protocols outside of the APN, the routers using that routing protocol to talk to the APN appliance will see that as a removal of these routes from the network. When the conduit comes back up, those routes will become active and get advertised to the external routing protocols.

Another advantage as described herein, the LAN routers 343 and the WAN routers 349 also learn APN internal topology and based on this learned APN internal topology the routers 343 and 349 are able to dynamically determine the best route available to direct traffic.

To facilitate easier configuration of routes in the APN, the APN through the processes described herein learns about the network in more detail than previously known and then adapts to changes in the network. In a preferred embodiment, a set of rules is provided by which the APNA filters the learned routes, maps them to a specified service, and updates the APNA routing table 335 stored in the forwarding information base (FIB) 334 used by the t2_app 315. A route import rule maps to a single service. A rule could match to many routes. Upon updating the route table in the FIB 334, the t2_app 315 distributes the route updates to the APNAs through available conduit connections. The t2_app 315 uses the APNA filter rules stored in a APN configuration file and thus in the registry 330 to filter the learned routes. Each of the APNA filter rules includes an if-a-matching-criteria-is-met part followed by a then-an-action-is-taken part.

For import filtering, a variety of matching criteria are provided, such as comprising routing domain, source router IP address, destination network, prefix length, next hop IP address, protocol, OSPF cost or BGP cost, each specified as a positive integer value. The action part of each APNA filter rule includes one or more of the following actions: adding route information into the FIB 334, exporting the matched route to other APNAs, assigning APN cost to the matched route, assigning type of APN service to the matched route, and setting the matched route to be eligible to be used based on a path or gateway. Eligibility, as used herein, indicates that routes to a service can be used. Eligibility ties into real time network characteristics and is separate from a service assignment on a route. For example, a route to 192.168.0.0/16 could be classified by the filters as using the service intranet-1. The APN configuration may state that intranet-1 should not be considered as working if a path-1 is DEAD. So, if the path-1 becomes DEAD, the t2_app marks the intranet-1 route to 192.168.0.0/16 as ineligible to ensure that route does not get used. Traffic to 192.168.0.0/16 would then be handled by some other route in the FIB. Also, the same kind of check is done on a gateway to a WAN link. If the gateway servicing the intranet-1 becomes unresponsive, an associated route is marked ineligible.

The type of APN service available to be selected includes a local service, which indicates the traffic is not going to use a WAN link, an Internet service, an intranet service, a LAN generic routing encapsulation (GRE) tunnel service, a LAN Internet protocol security (Ipsec) tunnel service, a passthrough service, and the like. In the rule's action part, a user can advantageously set a route's cost and service type. Thus, the rule's service type is selectable and not fixed. Also, for routes that are learned, the service type can be different, since they are not fixed to be just one service type. This approach advantageously allows the BIRD 304 to be kept separate from dealing with the registries and from being impacted by a configuration update of the APN. This approach also advantageously allows the OWL software system 302 to rescan any existing static and the dynamic routes with new filter rules on a configuration update. The new filter rules address a situation where a user updated one or more router filter rules in a router in the APN configuration.

A route processor 332 within the t2_app 315 builds the forwarding information base (FIB) 334 from various sources of routes, such as from the dynamically learned routes via conduits function 338 from conduit sources. This information base also includes routes learned from remote sites and sent across the conduits to be added into other sites' FIB, routes learned locally from APN DRP 314, and from static routes 328. Each route sent from the APN DRP 314 to t2_app 315, needs to be compared with filter rules stored in filter engine 326 to find the match according to the filter rule's matching criteria, see Tables 1 and 2 and associated description below. The filter rule expects every match criteria that the user specifies to match the route. Match criteria that the user does not specify is considered a "wild card" that matches everything. For example, if a router_learning_filter rule sets source_router_ip_addr=192.168.1.1 and all other fields are the wild card, by definition not set, then all routes from the router at 192.168.1.1 will match that rule. For a first matched filter rule, if the action parameter of the filter rule has "include" set, the route's cost and service type, service ID, eligibility type, eligibility value, export to APNAs are populated as set in the rule, and added into the FIB 334. If "include" is set, then the route is added into FIB 334, otherwise, the route is discarded. The route service type and service ID are set using rule's action part service type and service ID, such as local, conduit (also which conduit), Internet, or intranet (also which intranet). Also, if a rule's "export to APNAs" is set, then this route is also advertised to the other connected remote sites via a conduit according to the dynamically learned routes via conduits function 338. Also, an exemplary conduit 347 is shown that connects to remote sites 348 in the APN and is used to distribute learned routes throughout the APN.

A routing stack includes the route table 306 and at least one dynamic routing protocol (DRP) of the set of dynamic routing protocols 308, such as OSPF 310, BGP 312, and APN-DRP 314. To allow the routing stack to advertise the t2_app routes, the APN dynamic routing protocol (DRP) 314 that talks to route table 306 uses the same protocol that other dynamic routing protocols use, such as OSPF 310. The APN DRP 314 receives route updates from the t2_app 315 route processor 332 and sends the routes to route table 306 which makes the routes available to the OSPF 310 and the BGP 312. The OSPF 310 is configured to act as an autonomous system border router (ASBR) in order to advertise the routes that route table 306 learns from the t2_app 315 as autonomous system (AS)-external (type 5) link-state advertisements (LSAs). Within the Internet, an autonomous system (AS) is a collection of connected Internet protocol (IP) routing prefixes under the control of one or more network operators on behalf of a single administrative entity or domain that presents a common, clearly defined routing policy to the Internet.

The t2_app 315 FIB 334 often stores multiple routes for the same prefix. For example, it could have a route through a conduit with a cost of five, a route through an intermediate site through a different conduit with a cost of ten, and a fallback intranet route with a cost of sixteen. When communicating with the APN DRP 314, the available routes are sent to it and the destination network and the associated metric, such as a route cost, is checked. If everything checks out okay, received routes are inserted in the route table 306. The route table 306 notifies the OSPF 310 and BGP 312 about best routes to each network. Also, an APN protocol preference is set to a highest level so that the information can be advertised and used to steer traffic through a conduit if a route is available.

At startup, t2_app 315 creates a TAP-APN 322 network interface to represent the APN. This interface is also referred to as eth-bird-apn. No messages are exchanged through this interface, but it is used when interfacing with the route table 306 software. The TAP-APN 322 network interface only exists when t2_app is running and operational. That interface is monitored by the APN DRP 314 so that it can remove from BIRD any APN routes if the interface goes away. When a route is sent from t2_app 315 to the route table 306 software, the route message is formatted to indicate that the prefix is reachable through the eth-bird-apn interface. The route table 306 software is configured to ensure that the eth-bird-apn interface is up before adding a route to its route table. The route table 306 software 307 provides an import control hook so that the APN's own routes are not imported from the route table 306 and passed on to the t2_app 315. For route changes that BIRD publishes to the APN DRP 314, an import control hook callback is used to allow the APN DRP 314 to tell BIRD whether it is interested in a route or not. The import control hook is used so that the APN DRP 314 does not receive updates for APN routes, since it is already aware of those routes. The eth-bird-apn interface also provides an easy way to withdraw all the APN routes from the route table 306 because the BIRD routing daemon is configured to automatically withdraw all the APN routes, if the eth-bird-apn interface goes down.

The APN DRP 314 also provides the ability to advertise APN routes into the OSPF and BGP network. The APN DRP 314 primarily:

Receives route updates from the BIRD routing daemon;

Processes route updates and sends the updates to the t2_app 315 via a UNIX stream socket. Linux provides a variety of socket types. The UNIX stream socket is very similar to a TCP socket, but it is for communications between processes on the same system. The UNIX stream socket also connects to the t2_app 315 to receive a t2_app route via this socket, provides import control, such as to prevent advertising t2_app's routes to t2_app, and sends/advertises t2_app routes to route table 306.

The APN DRP 314 uses a UNIX stream socket to learn about the FIB 334. An interface between the t2_app 315 and the APN DRP 314 includes a message type from t2_app 315 to the APN DRP 314 and another message type from the APN DRP 314 to the t2_app 315. For example, a t2_route_update_message sent from the t2_app 315 to the APN DRP 314 is shown in Table 1.

TABLE 1 t2_route_update_message format

| Field | Type | Notes |
| --- | --- | --- |
| message_type | 8 bits | Current types:<br>ROUTE_MESSAGE_TYPE_NEW_ROUTE (1)<br>ROUTE_MESSAGE_TYPE_DEL_ROUTE (2)<br>ROUTE_MESSAGE_TYPE_REPORT_ID (3)<br>ROUTE_MESSAGE_TYPE_RESEND_ROUTES (4) |
| route_prefix | 32 bits in network byte order | The route_prefix and route_prefix_length fields are ways of describing a route destination. For example, for a route to destination 192.168.16.0/24, which covers all IP addresses from 192.168.16.0 through 192.168.16.255, the route_prefix would be set to the 32 bit value of 192.168.16.0 (0xC0A81000) and the route_prefix_length would be set to 24. The route_prefix_length indicates how many of the leading bits of the route_prefix should be considered part of the route. |
| route_prefix_length | 8 bits | |
| metric | 32 bits in host order | Sets a cost, or weight, on the route to allow for prioritization. It is assumed that a lower cost, or other metric, is better than a higher cost. |
| route_id | 32 bits | ID to identify the route. t2_app may send to route table software to same route_prefix/route_prefix_length with a different metric. This ID is needed to identify that if the same route just change the metric or to identify the route is a new route. |
| routing_domain_id | 8 bits | specifies which routing domain the route belongs to. A routing domain may be implemented by a route table. So supporting multiple routing domains means the APN supports multiple route tables. |

Also, an apn_entry_t message sent from the APN DRP 314 to the t2_app 315 is shown in Table 2. The APN DRP 314 uses this message format to send messages to the t2_app 315 to notify the t2_app 315 about an added new route or a deleted route.

When the t2_app 315 initially receives a connection on the UNIX stream socket, it sends one of these messages with a type of ROUTE_MESSAGE_TYPE_NEW_ROUTE based on entries in Table 1 or 2 for each route in the FIB 334 that should be advertised. After that, the t2_app 315 sends a ROUTE_MESSAGE_TYPE_NEW_ROUTE based on Table 1 or 2 and ROUTE_MESSAGE_TYPE_DEL_ROUTE messages based on Table 1 with routes that are to be added and to be deleted.

TABLE 2 apn_entry_t message format

| Field | Type | Notes |
|---|---|---|
| message_type | 8 bits | ROUTE_MESSAGE_TYPE_NEW_ROUTE (1) ROUTE_MESSAGE_TYPE_DEL_ROUTE (2) ROUTE_MESSAGE_TYPE_REPORT_ID (3) |
| network_address_network_byte_order | 32 bits | The network_address_network_byte_order and |
| prefix_length | 8 bits | prefix_length, are defined in a similar manner to the route_prefix and route_prefix_length described in Table 1. |
| Metric | 32 bits | See metric definition in Table 1. |
| routing_domain_id | 8 bits | See routing_domain_id definition in Table 1. |
| network_mask_network_byte_order | 32 bits | The network_mask_network_byte_order is a different representation of the route_prefix_length. It is a 32 bit value that has the leading route_prefix_length number of bits set to 1 and all other bits set to 0. |
| src_rtr_ip_network_byte_order | 32 bits | The src_rtr_ip_network_byte_order is the IP of the router that provided this route. |
| next_hop_network_byte_order | 32 bits | The next_hop_network_byte_order is the router IP address that the APNA sends packets that match this route to for forwarding. |
| Protocol | 8 bits | PROTOCOL_TYPE_ANY 0 PROTOCOL_TYPE_BGP 1 PROTOCOL_TYPE_OSPF 2 PROTOCOL_TYPE_APN 3 |

Not all routes in t2_app's FIB 334 should be sent to the route table 306 software. T2_app 315 does not send passthrough routes, discarded routes, IP Host routes, and routes learned from route table 306.

When the APN DRP 314 filters received route updates from the t2_app 315 and makes a determination to update the route table 306 with any changes, it does so by calling a route update function. This function is called by one of the DRPs of the set of dynamic routing protocols 308 whenever a new route is discovered or a determination is made to update or remove an existing route.

Route redistribution can be achieved by adding support to read configuration parameters in the APN DRP 314 and adding the following to BIRD 304:

```
protocol apn {
  import all;
  export all;
}
```

The "import all" step indicates that all routes the APN DRP 314 learned by an import process are added into the route table 306. The "export all" step ensures all routes in the route table 306 are advertised to the APN DRP 314.

It is important to note that discovering a route is only one part of determining and using optimized end-to-end routing paths. The t2_app 315 assigns routes to services and saves the assigned routes in the APN configuration file. If the APN configuration file specifies a route as local to a site, then remote sites, with a conduit to that site, receive a conduit route. For example, consider a site A with a local route R that has a conduit to site B. Site B is automatically configured with a route and specification that traffic to R is sent over the A-B conduit. In one embodiment, this is accomplished by having a configuration compiler add these routes to the registries of the various sites. In another embodiment, this route distribution is accomplished through network protocols as part of bringing up a conduit. Likewise, an intranet route allows the APNA to know that WAN bandwidth is consumed by traffic matching that route. This assignment of routes to services is an advantageous aspect to managing traffic through the WAN. Traffic on a service is classified in order to apply a proper quality of service (QoS) policy to the traffic using that route based on the assigned service. Also, security policies are configured with services and service types, such that assigning a service to a route means that the proper security policies are applied to the traffic using that route.

In order to assign a new route to a specific service, an APNA determines: whether the APNA should ignore this new route; whether the APNA should forward traffic using this new route; whether the traffic that is sent to this new route is local to the site? For example, is WAN bandwidth consumed by this traffic?; and whether an Internet service or an intranet service should be used for WAN traffic?

The OSPF 310 or the BGP 312 dynamic routing protocols are not able to make such determinations for the APNA. Consequently, a set of policies is provided to guide how learned routes are integrated into the APN. For each route sent from the route table 306 to the t2_app 315, the route is generally compared against all the APNA filter rules. A first matched filter rule is used to further process the route. The rule matching criteria includes routing domain, source router IP address, next hop IP address, destination network, prefix length, for which different comparison methods are supported, such as greater than or equal to, greater than, equal, less than or equal to, less than, and cost for which different comparison methods are supported such as prefix length. If a learned route matches the rule's matching criteria, then the learned route is processed with the rule's action part.

For example, if "include" is set, then the learned route is added into FIB 334, otherwise, the learned route is discarded. The route service type and service ID is set using a rule's action part service type and service ID, such as local, conduit and which conduit, Internet, or intranet and which intranet. Also, if a rule's "export to APNAs" is set, then this route is also advertised to the other connected remote sites via a conduit according to the dynamically learned routes via conduits function 338.

Figure 4A:
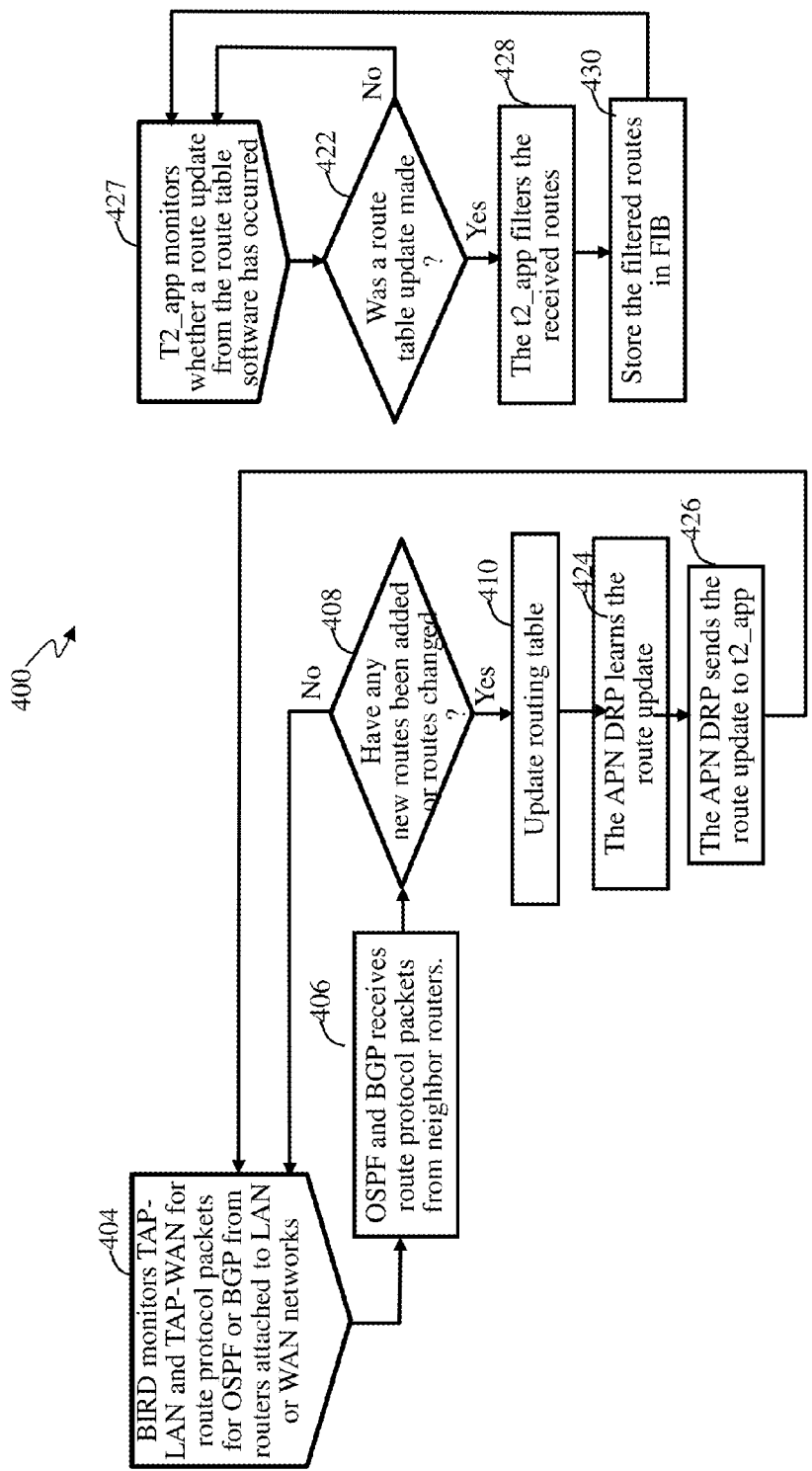
FIG. 4A illustrates an exemplary process of accessing LAN route information and advertising it to an adaptive private network (APN) in accordance with an embodiment of the present invention.

FIG. 4A illustrates an exemplary process 400 of accessing LAN route information and advertising it to an adaptive private network (APN) in accordance with an embodiment of the present invention. At step 404, BIRD 304 monitors TAP-LAN 318 and TAP-WAN 320 for route protocol packets for OSPF 310 or BGP 312 from routers 343 and 349 attached to LAN or WAN networks. At step 406, the OSPF 310 and BGP 312 receive route protocol packets from the neighborhood routers 343 and 349. At step 408, a determination whether any new routes have been added or routes changed is made. If no new routes have been added or no routes have changed, the process 400 proceeds to step 404 to continue monitoring for any route protocol packets from the neighborhood routers. If a new route has been added or a route has been changed, the process 400 proceeds to step 410. At step 410, the route table 306 is updated. At step 424, the APN DRP 314 learns the route update according to an import filter. At step 426, the APN DRP 314 sends the learned route update to the route processor 332 in the t2_app 315. The process 400 proceeds to step 404 to keep monitoring.

In parallel, at step 427, the t2_app 315 monitors the socket for route updates from the routing table software 307. At step 422, a determination is made whether a route table update was made. If no route table update was made, the process 400 proceeds to step 427 to keep monitoring. If a route table update was made, the process 400 proceeds to step 428. At step 428, the filter engine 326 in t2_app 315 filters the received routes. At step 430, the route processor 332 in the t2_app 315 stores the filtered routes in FIB 334 and the process 400 returns to step 427 to continue to check for any network route updates.

Figure 4B:
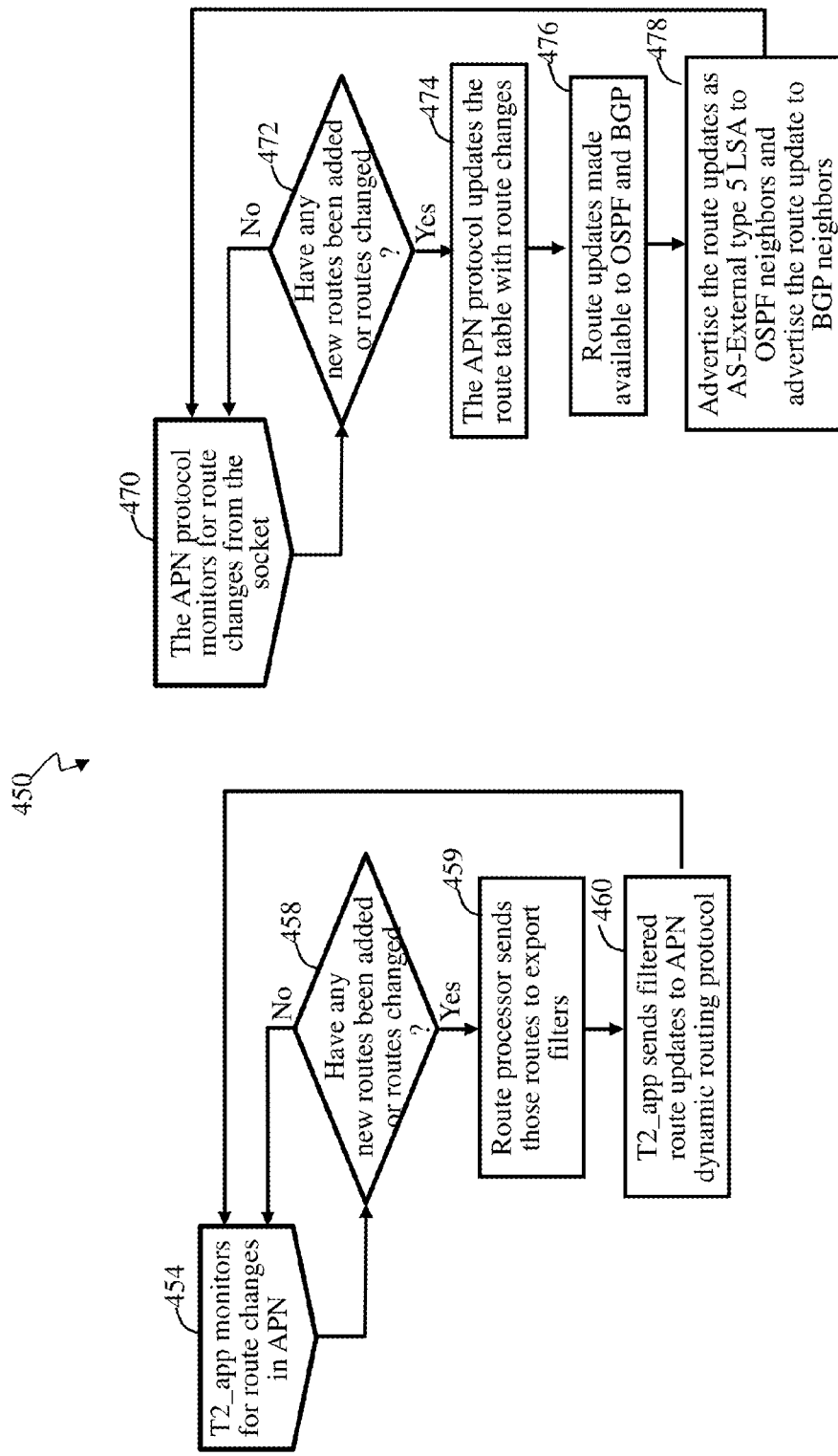
FIG. 4B illustrates an exemplary process of distributing APN routing information in an end-to-end system connecting multiple LANs via a WAN system in accordance with an embodiment of the present invention.

FIG. 4B illustrates an exemplary process 450 of distributing APN routing information in an end-to-end system connecting multiple LANs via a WAN system in accordance with an embodiment of the present invention. At step 454, the t2_app 315 monitors for route changes in the APN. APN route changes in the t2_app 315 can happen, for example, when the t2_app 315 receives a route update from the dynamically learned routes via conduits function 338 from a remote site, or a dynamic conduit is created which causes a route with lower cost. Also, APN route changes in the t2_app 315 can happen, for example, due to a configuration update when a user adds or removes or changes a static route, or conduit routes become unavailable when a conduit is down, or an Internet or intranet route becomes unavailable when a related WAN link is down, or a gateway of a WAN link goes down, or the like.

At step 458, a determination is made whether any new routes have been added or routes changed. If no new routes have been added or no routes have been changed, the process 450 returns to step 454 to continue monitoring the APN for route changes. If a new route has been added or a route has changed, the process 450 proceeds to step 459. At step 459, the route processor 332 sends the identified routes that have been added or changed to the export filters in filter engine 326 and then on to the APN DRP 314. Export filters, defined in a similar manner to an import filter, have a match part and action part. The match part includes a routing domain, a network address, a prefix, APN cost, a service type, a service name, and a gateway IP address. The action part includes an indication that is marked whether to export or not export the route to the APN DRP 314, and for routes to be exported to OSPF includes information to export as type 5 AS External or as type 1 intra-area route, and also includes an OSPF route weight. Advantageously, with the export filter, a user can easily control what APN routes are to be advertised to local LAN/WAN routers. For example, a user may decide that only routes with a conduit service are to be advertised. At step 460, the route processor 332 sends route updates to the APN DRP 314 and the process 450 returns to step 454 to continue monitoring the APN for route changes. In parallel, at step 470, the APN protocol 314 monitors for route updates from the socket. At step 472, a determination is made whether any new routes have been added or any routes changed. If no new routes have been added or no route has changed, the process 450 returns to step 470 wherein the APN DRP 314 continues to monitor for route changes sent from t2_app 315 to the socket. If at least one new route has been added or at least one route has changed, the process 450 proceeds to step 474. At step 474, the APN DRP 314 updates the route table 306 with route changes. At step 476, the route updates are made available to OSPF and BGP. At step 478, the route updates are advertised as AS-External type 5 or router (type 1) LSA to OSPF neighbors and the route updates are also advertised to BGP neighbors. The process 450 returns to step 470 for the APN DRP 314 to continue monitoring for route changes sent from the t2_app 315.

Figure 5:
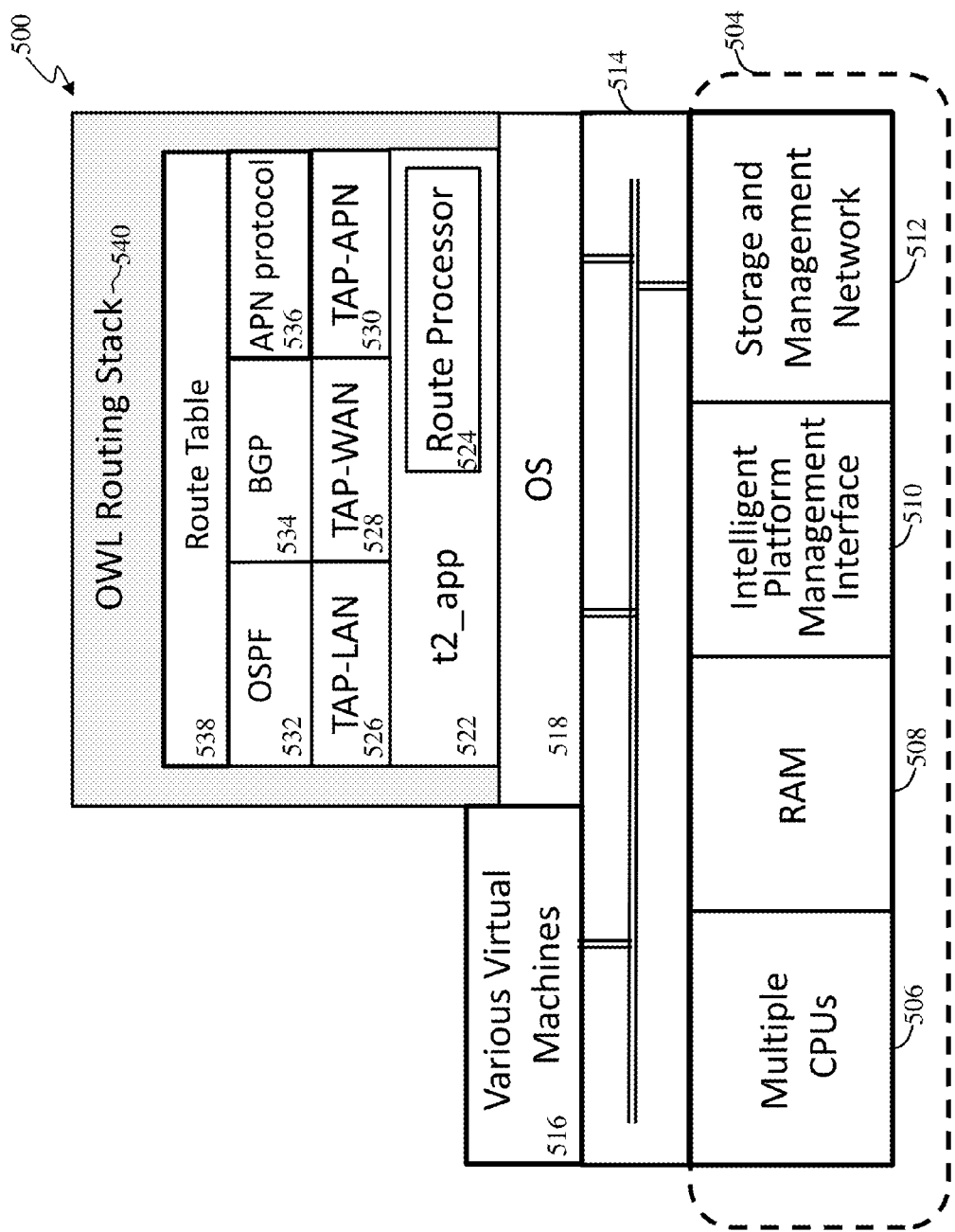
FIG. 5 illustrates a system view of an adaptive private network appliance architecture for accessing routing information from an end-to-end system connecting multiple LANs via a WAN system in accordance with an embodiment of the present invention.

FIG. 5 illustrates a system architecture 500 of an adaptive private network appliance (APNA) for accessing routing information from an end-to-end system connecting multiple LANs via a WAN system in accordance with an embodiment of the present invention. The system architecture 500 includes a hardware system portion 504 comprising multiple central processing units (CPUs) 506 configured in a parallel processing arrangement. Random access memory (RAM) 508 is configured as fast access memory for program storage and for fast access data storage. An intelligent platform management interface (ipmi) 510 and storage and management network 512 are hardware and software combinations that provide software configurability and access to high performance networks, peripheral ports for external devices, and APNA devices. A virtual switching infrastructure 514 provides communication between the various virtual machines 516 and an operating system (OS) 518, such as Linux. An OWL routing stack 540 comprises a t2_app 522, a route processor 524, a TAP-LAN 526, a TAP-WAN 528, a TAP-APN 530, the OSPF 532, the BGP 534, an APN DRP 536, and a route table 538. The OWL software stack 540 sits on top of the OS 518.

The multi-functional t2_app 522, also shown as t2_app 315 in FIG. 3, is configured in the OS 518 and communicates with other APNAs in the APN while forwarding user data. The t2_app 522 provides support for the NCN to distribute learned routes to other sites to enable client to client conduit communications when both clients are behind a network address translation (NAT) and the public IP address is not known in advance. The t2_app 522 and 315 also uses the APNA filter rules stored in a APN configuration file to filter the learned routes as described in more detail above. The route processor 332 that is a part of the t2_app 315 builds a forwarding information base (FIB) 334 from various sources of routes, such as from dynamic routes learned from route table 306 updates and from the dynamically learned routes via conduits function 338 from conduit sources, and from static routes 328. TAP interfaces 526, 528, and 530 can be considered a point-to-point or Ethernet like device which, instead of receiving packets from a physical media, receives the packets from the t2_app 315 and instead of sending packets via the physical media, writes the packets to the t2_app 315. For example, TAP-LAN 526, serves as a communication pipe between the OSPF 310 and BGP 312 dynamic routing protocols and bridging software 324 in the t2_app 315 for communication to LAN side routers 343. TAP-WAN 528 serves as a communication pipe between the OSPF 310 and BGP 312 dynamic routing protocols and bridging software 324 in the t2_app 315 for communication to WAN side routers 349. Routing protocols, such as OSPF 532 and BGP 534, learn about routes on their associated interfaces and make route information including route additions, deletions, and changes available for further processing. Router information from the routers and calculated routing information are stored in route table 538 and sent to another program which forwards packets according to the provided routing information.

The system architecture 500 is designed to be scalable to support additional CPUs. For example, as noted above, the multi-threaded architecture of t2_app 522 allows platforms with multiple CPUs to spread the processing of a packet across the multiple CPUs, which allows performance of the t2_app 522 to scale as more CPUs are made available.

While the present invention has been disclosed in the context of various aspects of presently preferred embodiments, it will be recognized that the invention may be suitably applied to other environments consistent with the claims which follow.

We claim:

1. A method to learn routes from a first network and advertise the learned routes in a second network for extending an adaptive private network (APN), the method comprising:
implementing, in an APN appliance (APNA), an open shortest path first (OSPF) protocol, a border gateway protocol (BGP), and an APN dynamic routing protocol (DRP);
monitoring, by an APNA application in the APNA, a route for a route change in the APN, the route change comprising quality metrics;
communicating, by the APNA application, the route change to the APN DRP;
in response to being notified by the APNA application of the route change in the APN, updating, by the APN DRP, a route table within the APNA with the APN route change, wherein the route table contains routes learned in a local area network (LAN) and routes learned in a wide area network (WAN);
configuring, by the APNA, the APN route change selected from the route table to a protocol associated with the LAN, wherein the protocol associated with the LAN includes the OSPF protocol; and
advertising, by the APNA, the configured APN route change in the protocol associated with the LAN to local routers in the LAN.

2. The method of claim 1, wherein the APN route change is in response to an APN conduit becoming unavailable when the conduit is down.

3. The method of claim 1, wherein the APN route change is in response to an APN dynamic conduit that has been created, new routes are available, and existing routes costs have changed.

4. The method of claim 1, wherein the APN route change is in response to a configuration update when a static route is added or an existing static route is removed.

5. The method of claim 1 further comprising:
selecting the APN route change from the route table;
configuring the selected APN route change to a protocol associated with the WAN; and
advertising the selected APN route change in the protocol to local routers in the WAN.

6. The method of claim 1 further comprising:
determining that the detected route change matches a criteria specified by filter rules;
storing the APN route change in the route table; and
assigning a learned route different services based upon the filter rules.

7. A method to detect and learn local area network (LAN) and wide area network (WAN) route information in an adaptive private network (APN), the method comprising:
implementing, in an APNA, an open shortest path first (OSPF) protocol, a border gateway protocol (BGP), and an APN dynamic routing protocol (DRP);
monitoring, by the APNA, route protocol packets to detect a route change from routers attached to the LAN and to the WAN, wherein the route protocol packets include OSPF packets and BGP packets;
updating a route table within the APNA with route information associated with the route change detected in the route protocol packets, the route information comprising route quality metrics;
notifying the APN DRP when routes learned via OSPF or BGP are added to or removed from the route table;
translating, by the APN DRP, the routes learned via OSPF or BGP to a format used by an APNA application, and communicating the translated routes learned via OSPF or BGP to the APNA application;
filtering, by the APNA application, the translated routes with matching criteria set up in filter rules, wherein for a route that matches the filter rule's matching criteria, a matching rule sets the route's service and the route is selectively stored into APN forwarding information storage of the APNA.

8. The method of claim 7, wherein the route stored in the forwarding information storage is used to find the best route to forward traffic utilizing the route quality metrics.

9. The method of claim 7, wherein the route is advertised to other sites for storage in the other sites forwarding information storage and used to find the best route to forward traffic.

10. The method of claim 7 further comprising:
selecting the route information associated with the route change from the route table;
configuring the route to a protocol associated with the LAN; and
advertising the configured route in the protocol to local routers in the LAN.

11. The method of claim 7 further comprising:
selecting the route information associated with the route change from the route table;
configuring the route to a protocol associated with the WAN; and
advertising the configured route in the protocol to local routers in the WAN.

12. A method to reduce outage time in a high availability adaptive private network (APN) system after a failover transfers control to a standby device, the method comprising:
implementing, in an active APN appliance (APNA), an open shortest path first (OSPF) protocol, a border gateway protocol (BGP), and an APN dynamic routing protocol (DRP);
configuring the active APNA to learn about routes in a LAN network connected to the APN and store the learned routes in an active APN routing table in the active APNA, the learned routes comprising route quality metrics, wherein the APNA learns about the routes in the LAN by receiving OSPF packets from the LAN and stores the routes in a route table separate from the active APN routing table, the OSPF notifies the APN DRP of changes in the route table, the APN DRP notifies an APNA application of the changes in the route table, and the APN application stores the routes in the active APN routing table;

transferring the learned routes from the active routing table to a standby APNA to be stored in a standby routing table of the standby APNA during normal operations of the active APNA; and bringing up the standby APNA with the learned routes already available from the standby routing table when the active APNA is down, wherein an outage due to the bringing up the standby APNA does not incur time to relearn the routes already stored in the standby routing table.

13. The method of claim 12 further comprising:

upon the standby APNA receiving notification that the previously active APNA is returning to active status, transferring the learned routes of the current configuration from the standby routing table to the active APNA to be stored on the active routing table during normal operations of the standby APNA.

14. A method for efficient management of traffic in a network, the method comprising:

implementing, in an adaptive private network (APN) appliance (APNA), an open shortest path first (OSPF) protocol, a border gateway protocol (BGP), and an APN dynamic routing protocol (DRP);

learning routes in a LAN by receiving OSPF packets from the LAN and storing the routes in a route table;

notifying an APN DRP of changes in the route table;

notifying, by the APN DRP, an APNA application of the changes in the route table;

filtering, by the APNA application, newly determined routes by comparing information fields of the newly determined routes with provided criteria to identify filtered routes that meet the provided criteria;

mapping, by the APNA application, the filtered routes to specified services; and updating, by the APNA application, an APN route table within the APNA with the filtered routes and the specified services, wherein changes to existing routes are automatically determined to improve management of traffic in the network.

15. The method of claim 14, wherein the provided criteria for an import filter comprises a routing domain, a source router IP address, a destination, protocol, and OSPF cost or BGP cost.

16. The method of claim 14, wherein the filtering uses filtering rules which are configured as an if a matching criteria is met part followed by an action to be taken part.

17. The method of claim 14, wherein the specified services are selected from a list of services that includes the Internet service or an intranet service.

18. The method of claim 14, wherein the specified services are selected from a list of services that includes a conduit service.

19. The method of claim 14, wherein the specified services are selected from a list of services that includes a local area network generic routing encapsulation tunnel service, a LAN Internet protocol security (IPSEC) tunnel service, or a passthrough service.

20. The method of claim 14, wherein the mapping the filtered routes to the specified services includes a user specifiable cost and service type.

21. The method of claim 14 further comprising:

rescanning dynamic routes with the filter rules on a configuration update which allows changes to existing routes to be automatically determined.

22. The method of claim 14, wherein the provided criteria for an export filter comprises a routing domain, a network address, service type, and APN cost.

23. The method of claim 16, wherein the action to be taken part is determined to include an OSPF route type 5 AS external and an OSPF route weight.

24. The method of claim 16, wherein the action to be taken part is determined to include an OSPF route type 1 intra-area and an OSPF route weight.

* * * * *